(12) United States Patent
Bevan et al.

(10) Patent No.: US 10,487,782 B2
(45) Date of Patent: Nov. 26, 2019

(54) METHOD AND SYSTEM FOR EXHAUST HEAT EXCHANGER DIAGNOSTICS

(71) Applicant: Ford Global Technologies, LLC, Dearborn, MI (US)

(72) Inventors: Karen Evelyn Bevan, Northville, MI (US); Ross Dykstra Pursifull, Dearborn, MI (US); Michael James Uhrich, Wixom, MI (US); Joseph Norman Ulrey, St. Joseph, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 15/913,554

(22) Filed: Mar. 6, 2018

(65) Prior Publication Data

US 2018/0195470 A1    Jul. 12, 2018

Related U.S. Application Data

(63) Continuation of application No. 15/296,950, filed on Oct. 18, 2016, now Pat. No. 9,909,541.

(51) Int. Cl.
*F01N 11/00*     (2006.01)
*F02M 26/49*     (2016.01)
(Continued)

(52) U.S. Cl.
CPC ......... *F02M 26/49* (2016.02); *B60H 1/00314* (2013.01); *B60H 1/00978* (2013.01); *B60H 1/025* (2013.01); *F01N 3/005* (2013.01); *F01N 3/038* (2013.01); *F01N 5/02* (2013.01); *F01N 11/002* (2013.01); *F02M 26/15* (2016.02); *F02M 26/25* (2016.02); *F02M 26/29* (2016.02); *F01N 2240/02* (2013.01);
(Continued)

(58) Field of Classification Search
CPC ........ F02M 26/49; F02M 26/25; F02M 26/15; F02M 26/29; B60H 1/00314; B60H 1/025; B60H 1/00978; F01N 3/038; F01N 3/005; F01N 5/02; F01N 11/002; F01N 2900/1406; F01N 2560/08; F01N 2560/06; F01N 2410/00; F01N 2240/22; F01N 2900/1404; F01N 2240/02; Y02T 10/47; Y02T 10/20; Y02T 10/16
See application file for complete search history.

(56) References Cited

U.S. PATENT DOCUMENTS 6,848,434 B2   2/2005   Li et al.
8,336,291 B2   12/2012   Hanari et al.
(Continued)

*Primary Examiner* — Thomas N Moulis
(74) *Attorney, Agent, or Firm* — Geoffrey Brumbaugh; McCoy Russell LLP

(57) ABSTRACT

Methods and systems are provided for carrying out on-board diagnostics of a plurality of components of an exhaust heat exchange system. In one example, degradation of one or more of a heat exchanger and a coolant system fluidically coupled to the heat exchanger may be detected based on a first temperature estimated upstream of the heat exchanger, a second temperature sensor estimated downstream of the heat exchanger, a coolant temperature, and a pressure estimated upstream of the heat exchanger. Also, degradation of a diverter valve of the heat exchange system may be detected based on inputs of a position sensor coupled to the diverter valve.

20 Claims, 10 Drawing Sheets

(51) Int. Cl.
    *F02M 26/15*     (2016.01)
    *F02M 26/29*     (2016.01)
    *F02M 26/25*     (2016.01)
    *B60H 1/00*     (2006.01)
    *B60H 1/02*     (2006.01)
    *F01N 5/02*     (2006.01)
    *F01N 3/00*     (2006.01)
    *F01N 3/038*     (2006.01)

(52) U.S. Cl.
    CPC ...... *F01N 2240/22* (2013.01); *F01N 2410/00* (2013.01); *F01N 2560/06* (2013.01); *F01N 2560/08* (2013.01); *F01N 2900/1404* (2013.01); *F01N 2900/1406* (2013.01); *Y02T 10/16* (2013.01); *Y02T 10/20* (2013.01); *Y02T 10/47* (2013.01)

(56) References Cited

U.S. PATENT DOCUMENTS

| | | |
|---|---|---|
| 8,959,904 B2 | 2/2015 | Porras et al. |
| 9,909,541 B1 * | 3/2018 | Bevan .................... F02M 26/49 |
| 2008/0279721 A1 | 11/2008 | Weiss et al. |
| 2011/0072801 A1 * | 3/2011 | Lupescu ................. F01N 3/031 60/287 |
| 2012/0151999 A1 * | 6/2012 | Seybold .................... F01N 5/02 73/49.8 |
| 2012/0312001 A1 * | 12/2012 | Nam .................... F02D 41/0072 60/299 |
| 2013/0139795 A1 | 6/2013 | Saitoh et al. |
| 2013/0213600 A1 | 8/2013 | Saitoh |
| 2013/0333673 A1 | 12/2013 | Frick et al. |
| 2015/0128916 A1 * | 5/2015 | Surnilla .............. F02D 41/0072 123/568.12 |
| 2015/0167519 A1 | 6/2015 | Gerges et al. |
| 2016/0025021 A1 * | 1/2016 | Hilditch ................. F02M 26/16 60/274 |
| 2016/0160772 A1 | 6/2016 | Keating |
| 2016/0341100 A1 | 11/2016 | Nagai et al. |
| 2017/0328263 A1 * | 11/2017 | Uhrich .................... F02M 26/06 |
| 2017/0335805 A1 * | 11/2017 | Zhang ....................... F01P 3/20 |
| 2018/0128145 A1 * | 5/2018 | Uhrich .................... F02M 26/21 |
| 2018/0156143 A1 * | 6/2018 | Hussain .................. F02D 41/26 |
| 2018/0202396 A1 * | 7/2018 | Zhang .................... F02M 26/04 |
| 2019/0039437 A1 * | 2/2019 | Jentz .................. B60H 1/00978 |

\* cited by examiner

3rd MODE

FIG. 6

| Diagnosis | Temperature upstream heat exchanger (T1) | Temperature downstream heat exchanger (T2) | Temperature coolant outlet line (T3) | Pressure upstream heat exchanger (P1) | Actual diverter valve position |
|---|---|---|---|---|---|
| Heat exchanger degraded (heat recovery and EGR mode) | Expected | Lower than expected | Lower than expected | Higher than expected | 1st / 2nd |
| Coolant system degraded (heat recovery and EGR mode) | Expected | Higher than expected | Lower than expected | Expected | 1st / 2nd |
| Diverter valve stuck in 2nd position (heat recovery mode) | Lower than expected | Lower than expected | Lower than threshold | Lower than expected | 2nd |
| Diverter valve stuck in 1st position (EGR mode and bypass mode) | Higher than expected | Higher than expected | Higher than expected | Higher than expected | 1st |
| Diverter valve partly open (heat recovery and EGR mode) | Higher than expected | Higher than expected | Higher than expected | Higher than expected | Partly open |
| First and second temperature sensors (bypass mode) | Not equal to T2 | Not equal to T1 | Expected | BP | 2nd |
| Pressure sensor (bypass mode) | Equal to T2 | Equal to T1 | Expected | Not equal to BP | 2nd |

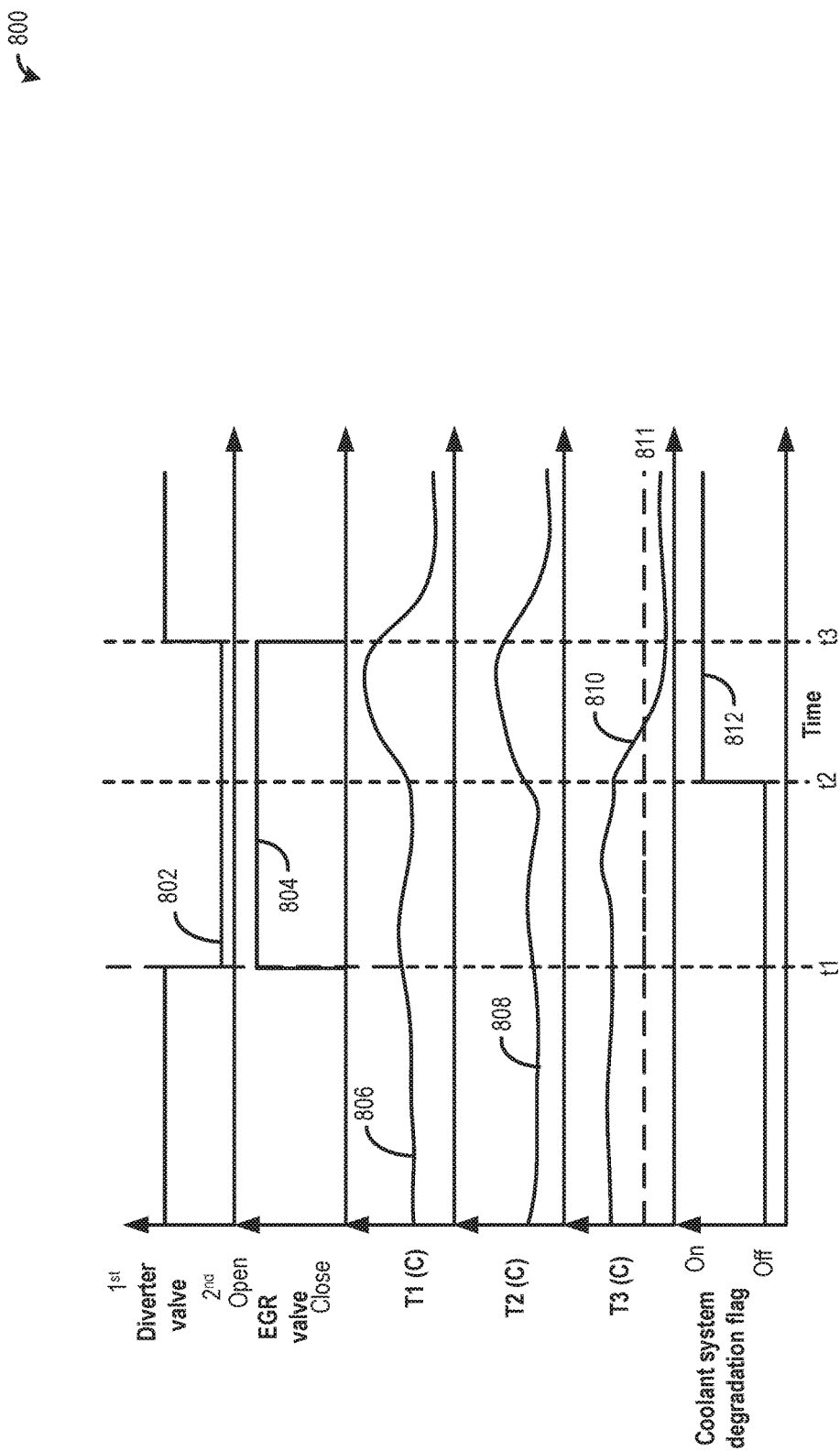

METHOD AND SYSTEM FOR EXHAUST HEAT EXCHANGER DIAGNOSTICS

CROSS REFERENCE TO RELATED APPLICATION

The present application is a continuation of U.S. patent application Ser. No. 15/296,950, entitled "METHOD AND SYSTEM FOR EXHAUST HEAT EXCHANGER DIAGNOSTICS," filed on Oct. 18, 2016, now U.S. Pat. No. 9,909,541. The entire contents of the above-referenced application are hereby incorporated by reference in its entirety for all purposes.

FIELD

The present description relates generally to methods and systems for on-board diagnostics of components of an exhaust heat exchange system.

BACKGROUND/SUMMARY

Engines may be configured with an exhaust heat recovery system for recovering heat from exhaust gas. The exhaust heat may be utilized for heating the engine coolant which may provide heat to the engine and also warm the passenger cabin, thereby improving engine and fuel efficiency. Further, exhaust gas may be recirculated to the intake manifold via an EGR system and used to reduce exhaust $NO_x$ emissions. An exhaust gas recirculation (EGR) cooler may be coupled to the EGR system to bring down the temperature of recirculated exhaust gas before it is delivered to the intake manifold. A combined heat exchange system may be used for both exhaust heat recovery and EGR cooling. A diagnostic procedure may need to be periodically or opportunistically carried out to monitor the different components of the engine system.

Various approaches are provided for diagnostics of an exhaust heat exchanger and an EGR cooler. In one example, as shown in U.S. Pat. No. 6,848,434, Li et al. discloses a method for diagnosing an EGR cooler coupled to an EGR delivery passage. An effectiveness factor for the EGR cooler is computed based on factors including exhaust gas temperature, EGR cooler outlet temperature, and engine coolant temperature. The effectiveness factor is compared to a threshold, and if the effectiveness factor is lower than the threshold, malfunction of the EGR cooler is determined. The threshold may be based on EGR flowrate through the delivery passage.

However, the inventors herein have recognized potential issues with the above approach. As one example, in embodiments having a combined heat exchange system where a common heat exchanger is used for both exhaust heat recovery and EGR cooling, it may not be possible to reliably detect degradation of the EGR cooler function using a single effectiveness factor. In particular, it may be difficult to differentiate issues with the EGR cooling functionality of the combined heat exchange system from issues with the exhaust heat recovery functionality. Further, due to the presence of a plurality of valves enabling different combinations of EGR and exhaust heat recovery functionality, it may be difficult to parse out issues associated with the valves from issues associated with the heat exchanger or with a coolant line circulating coolant through the heat exchanger.

The inventors herein have identified an approach by which the issues described above may be at least partly addressed. One example method comprises, indicating degradation of a heat exchange system diverting exhaust, via a diverter valve, from downstream of an exhaust catalyst into a heat exchanger in an exhaust bypass, the indicating based on each of a first exhaust temperature and an exhaust pressure estimated upstream of the heat exchanger, a second exhaust temperature estimated downstream of the heat exchanger, and a temperature of coolant circulating through the heat exchanger. In this way, by using a plurality of temperature, pressure, and diverter valve position sensors, each component of the exhaust heat exchange system may be reliably diagnosed.

In one example, an engine system may be configured with a single heat exchanger for EGR cooling and exhaust heat recovery. The heat exchanger may be positioned in an exhaust bypass passage disposed parallel to a main exhaust passage, and a diverter valve coupled to the main exhaust passage may be used to enable exhaust to be diverted into the bypass passage or directed through the main passage into the tailpipe. An EGR delivery passage including an EGR valve may be coupled to the bypass passage downstream of the heat exchanger. One or more temperature and pressure sensors may be coupled to the bypass passage upstream and downstream of the heat exchanger. Also, a temperature sensor may be housed in the outgoing coolant line of a coolant system fluidically coupled to the heat exchanger. The heat exchanger system may be operated in a plurality of modes by adjusting a position of the diverter valve and the EGR valve, and based on the operational mode, inputs from each of the temperature and pressure sensors may be periodically or opportunistically used for diagnosing the components of the heat exchange system. As one example, during an operational mode where only exhaust heat recovery is being carried out, the presence of a higher than threshold pressure upstream of the heat exchanger may be used to infer degradation of the heat exchanger (such as due to clogging). During the same mode, a drop in coolant temperature may be used to infer degradation of the coolant system (such as due to clogging of the coolant line). As another example, during an operational mode where both exhaust heat recovery and EGR delivery is being carried out, a lower than threshold coolant temperature may be used to infer degradation of the heat exchanger acting as an EGR cooler. The thresholds applied during the exhaust heat recovery only mode may be distinct from those applied during the combined exhaust heat recovery and EGR delivery mode. In each mode, inputs from a position sensor coupled to the diverter valve together with inputs from the temperature and pressure sensors may be used to infer degradation of the diverter valve. Further, during an operational mode where exhaust is not routed via the bypass passage, the various temperature and pressure sensors may be diagnosed based on exhaust temperature upstream of the heat exchanger being substantially equal to the exhaust temperature downstream of the heat exchanger and the exhaust pressure being substantially equal to atmospheric pressure.

In this way, by using existing temperature and pressure sensors coupled to a bypass passage of the exhaust system, on-board diagnostics of a plurality of components of a combined heat exchange system may be effectively carried out. By comparing exhaust temperatures measured upstream and downstream of the heat exchanger to temperatures expected at those locations based on the operational mode of the combined heat exchanger system a blockage in the heat exchanger may be reliably detected. By comparing the exhaust temperature changes to coolant temperature changes in each mode, heat exchange issues associated with the heat exchanger may be better differentiated from those associated with the coolant system coupled to the heat exchanger. The technical effect of adjusting the temperature and pressure thresholds applied during the diagnostics based on the mode of operation of the combined heat exchange system (such as based on whether the system is being used for only exhaust heat recovery or for exhaust heat recovery and EGR delivery) is that the different functionalities of the combined heat exchange system can be independently diagnosed using the same set of sensors. By opportunistically monitoring the health of each of the sensors used for the diagnostic process, reliability of the on-board diagnosis of the heat exchange system may be improved. By enabling diagnostics of the exhaust heat exchange system to be carried out reliably and accurately, the fuel economy and emissions benefits of a combined heat exchange system may be extended over a wider range of engine operating conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 shows a table illustrating diagnostic parameters for different components of the heat exchange system of FIGS. 1A-1C.

FIG. 8 shows a second example of diagnosing a coolant system fluidically coupled to the heat exchanger of FIGS. 1A-1C, according to the present disclosure.

DETAILED DESCRIPTION

Figure 1A:
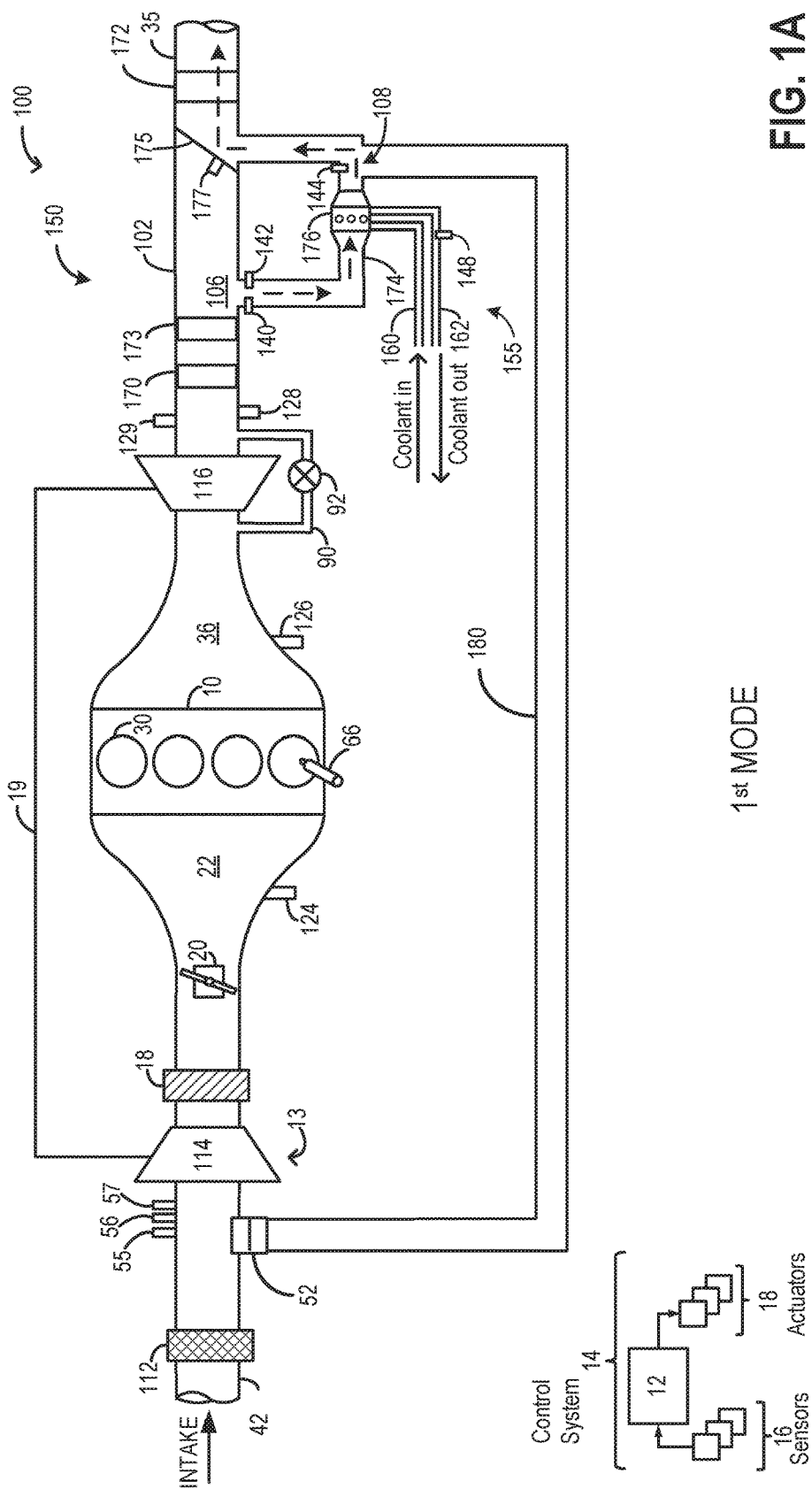
FIG. 1A shows an example embodiment of an engine system including a heat exchange system, operating in a first mode.
Figure 1B:
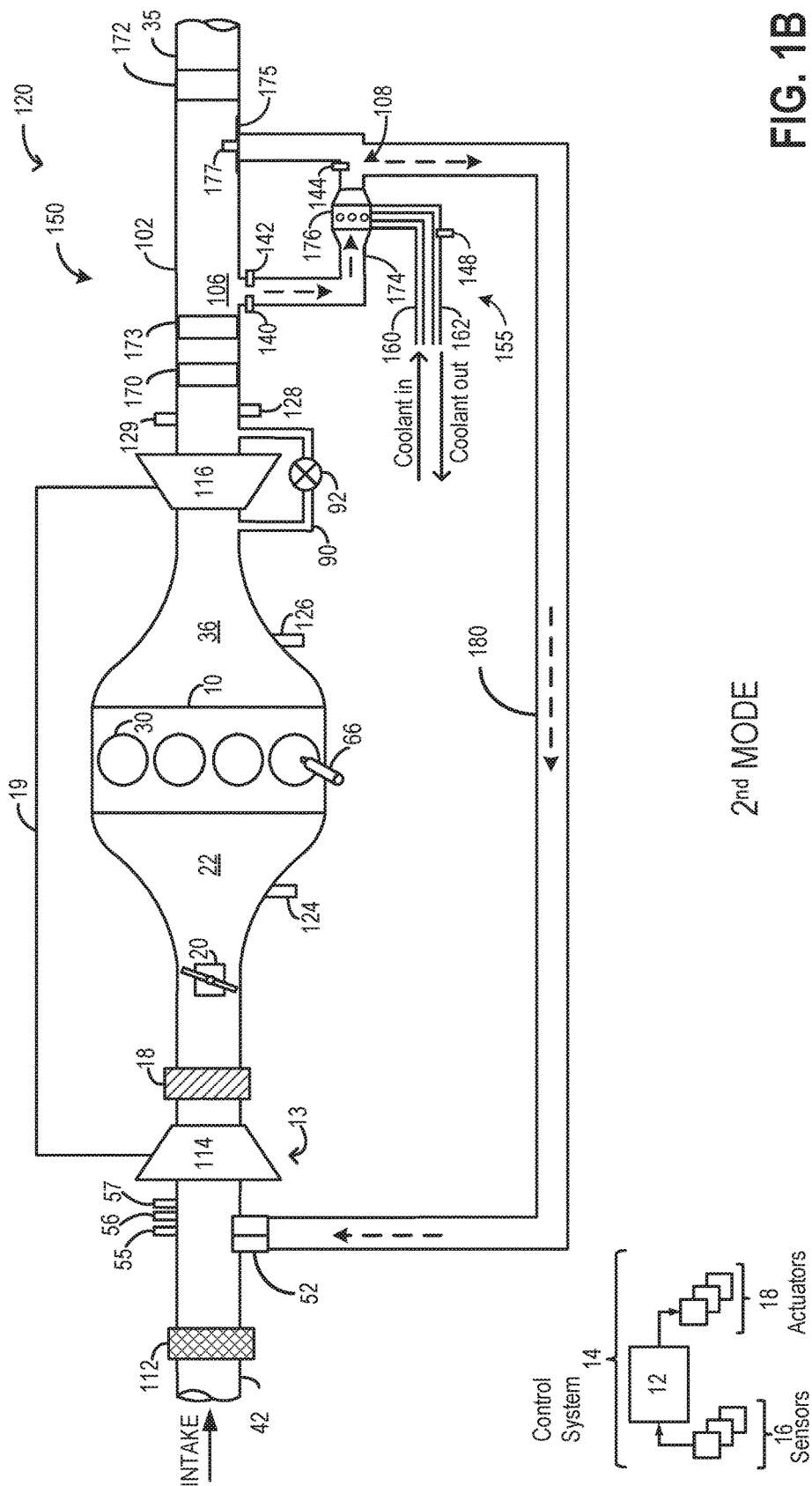
FIG. 1B shows an example embodiment of an engine system including a heat exchange system, operating in a second mode.
Figure 1C:
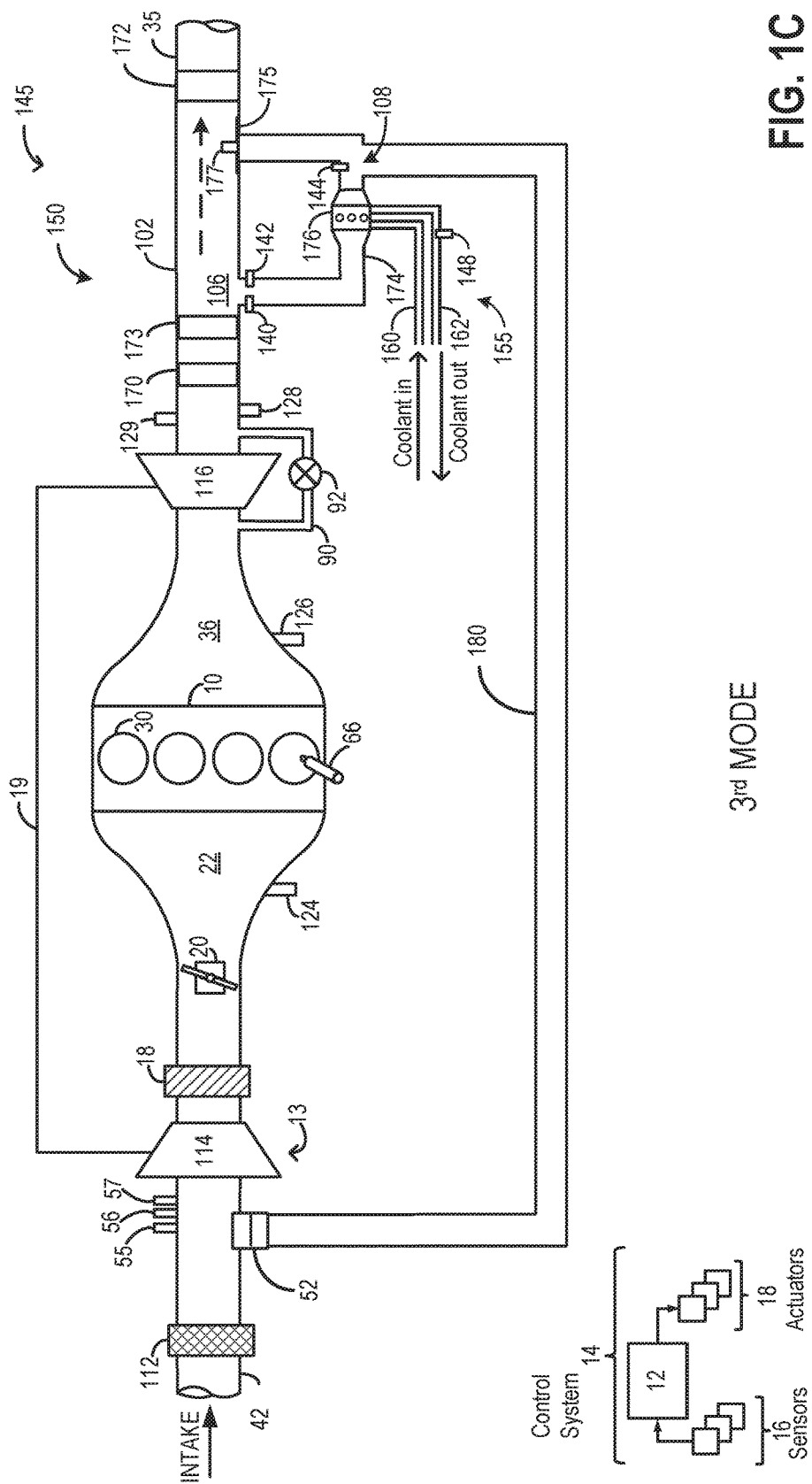
FIG. 1C shows an example embodiment of an engine system including a heat exchange system, operating in a third mode.

The following description relates to systems and methods for on-board diagnostics of a plurality of components of an exhaust heat exchange system. The exhaust heat exchange system may include a single heat exchanger (coupled to a bypass passage) for exhaust gas heat recovery and exhaust gas recirculation (EGR) cooling. Different modes of operation of the exhaust heat exchange system are shown in FIGS. 1A-1C. An engine controller may be configured to perform control routines, such as the example routines of FIGS. 2, 3, 4 and 5, to periodically or opportunistically diagnose the components of the exhaust heat exchange system, such as the heat exchanger, a coolant system fluidically coupled to the heat exchanger, a diverter valve directing exhaust through the heat exchanger, as well as one of more system sensors. Parameters and thresholds used to diagnose each component may be varied based on the selected mode of operation, as tabulated in FIG. 6. Example diagnostic routines are shown with reference to FIGS. 7 and 8.

FIG. 1A schematically shows aspects of an example engine system 100 including an engine 10. In one example, engine system 100 is coupled in a propulsion system, such as a vehicle configured for on-road travel. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1A, compressor 114 is coupled through charge-air cooler (CAC) 21 to throttle valve 20. Throttle valve 20 is coupled to engine intake manifold 22. From the compressor, the compressed air charge flows through the charge-air cooler 21 and the throttle valve to the intake manifold. In the embodiment shown in FIG. 1A, the pressure of the air charge within the intake manifold is sensed by manifold air pressure (MAP) sensor 124.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator 92 may be actuated open to dump at least some exhaust pressure from upstream of the turbine to a location downstream of the turbine via wastegate 91. By reducing exhaust pressure upstream of the turbine, turbine speed can be reduced, which in turn helps to reduce compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied with one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1A, exhaust from the one or more exhaust manifold sections may be directed to turbine 116 to drive the turbine. The combined flow from the turbine and the wastegate then flows through emission control devices 170 and 173. In one example, the first emission control device 170 may be a light-off catalyst, and the second emissions control device 173 may be an underbody catalyst. In general, the exhaust after-treatment devices 170 and 173 are configured to catalytically treat the exhaust flow, and thereby reduce an amount of one or more substances in the exhaust flow. For example, the exhaust after-treatment devices 170 and 173 may be configured to trap $NO_x$ from the exhaust flow when the exhaust flow is lean, and to reduce the trapped $NO_x$ when the exhaust flow is rich. In other examples, the exhaust after-treatment devices 170 and 173 may be configured to disproportionate $NO_x$ or to selectively reduce $NO_x$ with the aid of a reducing agent. In still other examples, the exhaust after-treatment devices 170 and 173 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

From downstream of the second emission control device 173, exhaust may flow to muffler 172 via one or more of a main exhaust passage 102 and a bypass passage 174. For example, all or part of the treated exhaust from the exhaust after-treatment devices 170 and 173 may be released into the atmosphere via main exhaust passage 102 after passing through a muffler 172. Alternatively, all or part of the treated exhaust from the exhaust after-treatment devices 170 and 173 may be released into the atmosphere via an exhaust heat exchange system 150 coupled to the main exhaust passage. The heat exchange system 150 can be operated for exhaust heat recovery for use in engine heating as well as for EGR cooling. The components of the heat exchange system also enable exhaust heat recovery and EGR cooling to be concurrently performed using a single heat exchanger, as elaborated below.

Bypass passage 174 of the exhaust heat exchange system 150 may be coupled to the main exhaust passage 102 downstream of the second emission control device 173 at junction 106. The bypass passage 174 may extend from downstream of the second emission control device 173 to upstream of muffler 172. The bypass passage 174 may be arranged parallel to the main exhaust passage 102. A heat exchanger 176 may be coupled to bypass passage 174 to cool the exhaust passing through the bypass passage 174. In one example, the heat exchanger 176 is a water-gas exchanger. An engine coolant system 155 may be fluidically coupled to the exhaust heat exchanger 176 for exhaust heat recovery and EGR cooling. A coolant of the coolant system may flow through the heat exchanger via a coolant inlet line 160 and after circulating through the heat exchanger, the coolant may return to the engine or may be routed to a heater core via a coolant outlet line 162.

Exhaust gas recirculation (EGR) delivery passage 180 may be coupled to the exhaust bypass passage 174 at junction 108, downstream of heat exchanger 176, to provide low pressure EGR (LP-EGR) to the engine intake manifold, upstream of compressor 114. In this way, exhaust cooled via heat exchanger 176 can be recirculated to the engine intake. In further embodiments, the engine system may include a high pressure EGR flow path wherein exhaust gas is drawn from upstream of turbine 116 and recirculated to the engine intake manifold, downstream of compressor 114. One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors 55-57 coupled to the compressor inlet. In one example, air-fuel ratio sensor 57 is an oxygen sensor.

A diverter valve 175 coupled to the junction of the main exhaust passage 102 and an outlet of the bypass passage 174, downstream of the heat exchanger 176, may be used to regulate the flow of exhaust through the bypass passage 174. A position of the diverter valve may be adjusted responsive to signals received from an engine controller to operate the exhaust heat exchange system in a selected mode of operation. In one example, the diverter valve may be actuated to a first fully open position to flow exhaust flow from downstream of the catalyst (second emission control device) 173 to the tailpipe 35 via the exhaust bypass 174, thereby enabling the heat exchange system to be operated in a first mode where only exhaust recovery is provided. As another example, the diverter valve may be actuated to a second, fully closed position to direct all exhaust to the tailpipe via the main exhaust passage while disabling exhaust flow from downstream of the catalyst 173 to the tailpipe 35 via the exhaust bypass 174. By concurrently adjusting a position of an EGR valve 52, the heat exchanger system may be operated in a second mode where EGR is provided to the engine intake passage 42 or a third mode where thee exhaust is directly routed to the tailpipe 35. A high resolution position sensor 177 may be coupled to the diverter valve 175 for providing an accurate indication regarding the position of diverter valve 175 to an engine controller. As elaborated herein, degradation of the diverter valve may be inferred based on the estimated position of the diverter valve relative to the commanded (first or second) position.

EGR valve 52 may be coupled to the EGR passage 180 at the junction of the EGR passage 180 and the intake passage 42. EGR valve 52 may be opened to admit a controlled amount of exhaust from bypass passage 174, downstream of heat exchanger 176, to the compressor inlet for desirable combustion and emissions control performance. EGR valve 52 may be configured as a continuously variable valve or as an on/off valve. Depending on operating conditions, such as engine temperature, a portion of the exhaust may be diverted through bypass passage 174 and thereon to tailpipe 35 or to the inlet of compressor 114 via the EGR passage 180 and the exhaust gas recirculation (EGR) valve 52. Opening of the diverter valve 175 and the EGR valve 52 may be regulated to control the flow of exhaust though the bypass passage 174 and the heat exchanger 176.

A plurality of sensors may be coupled to the exhaust heat exchange system 150 The plurality of sensors include a first temperature sensor 140 coupled to the bypass passage 174, upstream of the heat exchanger 176, and a second temperature sensor 144 coupled to the bypass passage 174, downstream of the heat exchanger 176. Temperature sensors 140, 144 may be configured to estimate a temperature of exhaust flowing into and out of the heat exchanger, respectively. A third temperature sensor 148 may be coupled to the coolant outlet line 162 for estimating temperature of coolant after circulating through the heat exchanger 176. A pressure sensor 142 may be coupled to the bypass passage 174, upstream of the heat exchanger 176, for estimating pressure in the bypass passage upstream of the heat exchanger 176. The plurality of sensors further include high resolution position sensor 177 coupled to diverter valve 175. Input from one or more or all of the plurality of sensors may be used during each mode of operation of the heat exchange system to diagnose the various components of the heat exchange system.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include temperature sensors 140 and 144 coupled to the exhaust bypass 174, temperature sensor 148 coupled to the coolant outlet line 162, pressure sensor 142 coupled to the bypass passage 174, high resolution position sensor 177 coupled to the diverter valve 175, exhaust gas sensor 126 located upstream of the turbine 116, MAP sensor 124, exhaust temperature sensor 128, compressor inlet temperature sensor 55, compressor inlet pressure sensor 56, compressor inlet humidity sensor 57, and EGR sensor. Other sensors such as additional pressure, temperature, air/fuel ratio, and composition sensors may be coupled to various locations in engine system 100. The actuators 81 may include, for example, throttle 20, EGR valve 52, diverter valve 175, wastegate 92, and fuel injector 66. The control system 14 may include a controller 12. The controller 12 may receive input data from the various sensors, process the input data, and trigger various actuators in response to the processed input data based on instruction or code programmed therein corresponding to one or more routines. For example, based on engine operating conditions and EGR requirements, the controller 12 may command a signal to an actuator coupled to the diverter valve 175, and an actuator coupled to the EGR valve 52 to direct exhaust to the intake manifold and/or the tailpipe via the heat exchanger 176. Also, the controller may periodically or opportunistically diagnose each of the heat exchanger 176, the coolant system 155, and the diverter valve 175 based on inputs from each of the temperature sensors 140, 144, and 148, pressure sensor 142, and the diverter valve position sensor 177. Example control routines for exhaust heat exchange system 150 diagnostics are described with regard to FIGS. 2, 3, 4 and 5.

FIG. 1A shows operation of the exhaust heat exchange system 150 in a first operating mode. As such, the first operating mode represents a first setting of the diverter valve 175 and the EGR valve 52 that enables exhaust flow control. In the first operating mode, the diverter valve 175 may be in a first (fully open) position, and the EGR valve 52 may be in a fully closed position. When in the first operating mode, due to the first position of the diverter valve 175, the entire volume of exhaust exiting the second emissions control device 173 may be diverted into the bypass passage at junction 106. The exhaust may then flow through the heat exchanger 176 and then return to the main exhaust passage via the open diverter valve 175. Due to the closed position of the EGR valve 52, the exhaust flowing through the bypass passage may not flow into the EGR passage 180, and the entire volume of exhaust may re-enter the main exhaust passage 102. After re-entering the main exhaust passage 102, exhaust may flow through muffler 172, and then be released into the atmosphere via the tailpipe 35. As the exhaust passes through the heat exchanger 176, heat from the exhaust may be transferred to the coolant circulating through the heat exchanger 176. Upon transfer of heat from the exhaust to the coolant, the warmed coolant may be circulated back to and around the engine (such as when engine heating is required) and/or through a heater core for heating a passenger cabin of the vehicle (such as when cabin heating is requested) via the coolant outlet line 162.

The exhaust heat exchange system may be operated in the first operating mode (as described above) during conditions when exhaust heat needs to be recovered for heating the engine, such as during engine cold-start conditions. By diverting exhaust through the heat exchanger 176 during an engine cold-start, heat from the exhaust may be recovered at the heat exchanger and transferred to the coolant circulating through the heat exchanger 176. The hot coolant may then be circulated around an engine block so that heat extracted from the exhaust may be used for engine warm-up. By expediting engine warm-up during the cold-start, cold-start exhaust emissions may be reduced, and engine performance may be improved. In addition, where the engine is coupled in a vehicle, the hot coolant may be circulated around a heater core for providing heat to a passenger cabin of the vehicle.

During operation in the first mode, on-board diagnostics of the heat exchanger 176 and the coolant system 155 may be carried out using inputs from each of temperature sensors 140, 144, 148, and pressure sensor 142. Also, diagnostics of the diverter valve 175 may be carried out based on input from position sensor 177.

As an example, if the heat exchanger is clogged, exhaust flow through the heat exchanger may be limited. Consequently, exhaust pressure may start to build upstream of the heat exchanger 176, with a corresponding rise in exhaust temperature. This also results in a larger exhaust temperature differential across the heat exchanger. Thus, while operating in the first mode, degradation of the heat exchanger 176 may be indicated responsive to one or more or each of an exhaust pressure measured upstream of the heat exchanger 176 being higher than a first threshold pressure (such as above barometric pressure, or above the exhaust pressure in the tailpipe), a first exhaust temperature measured upstream of the heat exchanger 176 being higher than a threshold temperature (such as above the temperature of exhaust in the main exhaust passage), and a temperature difference between the first exhaust temperature measured upstream of the heat exchanger by the first temperature sensor 140 and a second exhaust temperature measured downstream of the heat exchanger 176 by the second temperature sensor 144 being higher than a first threshold difference. Indicating degradation of the heat exchanger 176 may include indicating that the heat exchanger 176 is clogged. Further, a degree of clogging may be indicated based on the temperature and pressure deviation from the corresponding thresholds.

As another example, if the coolant system is clogged, coolant flow through the heat exchanger may be limited. Consequently, exhaust heat may not be effectively transferred to the coolant circulation through the heat exchanger, causing a drop in the temperature estimated at the outgoing coolant line 162. Thus, while operating in the first mode, degradation of the coolant system 155 circulating coolant through the heat exchanger may be indicated responsive to coolant temperature measured at an outgoing line of the coolant system being lower than a first threshold coolant temperature (such as an expected coolant temperature after heat transfer from exhaust). Indicating degradation of the coolant system 155 may include indicating a lower than expected coolant flow-rate due to a clogging or pinching of the coolant line. In this way, by relying on the exhaust temperature deviations and the coolant temperature deviations, reduced exhaust heat recovery due to issues with the heat exchanger may be better distinguished from issues with the coolant system, and appropriate mitigating actions may be performed.

As another example, in the first mode, the diverter valve may be commanded to the first (fully open) position to enable exhaust flow to be diverted into the bypass passage. However, if the diverter valve is stuck closed in the second position, or if the valve is only partially open, the requisite exhaust flow is not diverted through the heat exchanger and the corresponding exhaust heat recovery is not achieved. A controller may indicate that the diverter valve 175 is stuck closed (in the second position) or partially open (in between the first and second position) responsive to an actual position of the diverter valve 175 estimated by the position sensor 177 differing from the commanded fully open (first) position.

Responsive to the indication of degradation of one or more of the heat exchanger 176, the coolant system 155, and the diverter valve 175, diverting of exhaust through the heat exchanger 176 in the exhaust bypass 174 may be disabled. Instead, direct flow of exhaust to the tailpipe 35 via the main exhaust passage 102, bypassing the heat exchanger 176, may be enabled.

FIG. 1B shows a schematic view 120 of operation of the exhaust heat exchange system 150 in a second operating mode. Components previously introduced in FIG. 1A are numbered similarly and not reintroduced.

As such, the second operating mode represents a second setting of the diverter valve 175, and the EGR valve 52 that enables exhaust flow control. In the second operating mode, the diverter valve 175 may be in the second (fully closed) position, and the EGR valve 52 may be in an open position Due to the fully closed position of the diverter valve 175, exhaust flow from the bypass passage 174 to the main exhaust passage 102 may be disabled. An opening of the EGR valve 52 may be adjusted to allow a desired amount of exhaust to enter the bypass passage 174, and the EGR delivery passage 180. When in the second operating mode, due to the open position of the EGR valve 52, and a closed position of the diverter valve, a first portion of exhaust may be drawn from the bypass passage, downstream of the heat exchanger acting as an EGR cooler, and delivered to the engine intake manifold. A second (remaining) portion of exhaust may not enter the bypass passage but may flow directly to the tailpipe via the muffler 172. The first portion of the exhaust, after being cooled at the heat exchanger 176, may enter the EGR delivery passage 180 at junction 108. The EGR may be delivered to the engine intake manifold via the EGR delivery passage 180, and the EGR valve 52. The ratio of the first portion of exhaust (delivered as EGR) to the second portion of exhaust (directly routed to tailpipe without cooling) may be determined based on a desired EGR level. EGR may be requested to attain a desired engine dilution, thereby improving fuel efficiency and emissions quality. An amount of EGR requested may be based on engine operating conditions including engine load, engine speed, engine temperature, etc. For example, the controller may refer a look-up table having the engine speed and load as the input, and having a signal corresponding to a degree of opening to apply to the EGR valve as the output, the degree of opening providing a dilution amount corresponding to the input engine speed-load. In still other examples, the controller may rely on a model that correlates the change in engine load with a change in the engine's dilution requirement, and further correlates the change in the engine's dilution requirement with a change in the EGR requirement. For example, as engine load increases from a low load to a mid-load, EGR requirement may increase, and then as engine load increases from a mid-load to a high load, EGR requirement may decrease.

The exhaust heat exchange system may be operated in the second operating mode (as described above) when EGR is requested after engine warm-up has been completed and when exhaust heat is no longer be desired for engine heating purposes. During operation in the second mode, the controller may diagnose one or more heat exchange system components upon confirming that the EGR valve is not degraded. In one example, degradation of the EGR valve may be estimated using a differential pressure feedback sensor monitoring EGR flow-rate across an orifice in the EGR delivery passage 180. Upon confirmation that the EGR valve is functional, the controller may diagnose the heat exchanger 176 and the coolant system 155 using inputs from each of the temperature sensors 140, 144, and 148, and the pressure sensor 142. Also, the diverter valve 175 may be diagnosed while operating the heat exchange system in the second mode based on inputs from the position sensor 177.

During operation in the second mode, while the EGR valve 52 is not degraded, if the heat exchanger is clogged, exhaust flow through the heat exchanger 176 may be limited. Consequently, exhaust pressure may start to build upstream of the heat exchanger 176, with a corresponding rise in exhaust temperature. As a smaller amount of exhaust flows through the clogged heat exchanger, exhaust temperature downstream of the heat exchanger may be lower than an expected temperature. This also results in a larger exhaust temperature differential across the heat exchanger. In this second mode, degradation of the heat exchanger 176 may be indicated responsive to one or more or each of an exhaust pressure measured upstream of the heat exchanger 176 being higher than a first threshold pressure (such as above barometric pressure, or above the exhaust pressure in the tailpipe), a first exhaust temperature measured upstream of the heat exchanger 176 being higher than a threshold temperature (such as above the temperature of exhaust in the main exhaust passage), and a temperature difference between the first exhaust temperature measured upstream of the heat exchanger 176 by the first temperature sensor 140 and a second exhaust temperature measured downstream of the heat exchanger 176 by the second temperature sensor 144 being higher than a first threshold difference. Also, a degree of clogging may be indicated based on the temperature and pressure deviation from the corresponding thresholds.

As another example, if the coolant system is clogged, coolant flow through the heat exchanger 176 (used as EGR cooler in the second mode) may be limited. Consequently, the heat from the recirculated exhaust may not be effectively transferred to the coolant at the heat exchanger 176, causing a drop in the temperature estimated at the outgoing coolant line 162. Thus, while operating in the second mode, degradation of the coolant system 155 may be indicated responsive to coolant temperature measured at an outgoing line 162 of the coolant system being lower than a threshold coolant temperature (such as an expected coolant temperature after EGR cooling). Indicating degradation of the coolant system 155 may include indicating a lower than expected coolant flow-rate due to a clogging or pinching of the coolant line.

As another example, in the second mode, the diverter valve may be commanded to the second (fully closed) position to disable exhaust flow to return to the main exhaust passage 102 from the bypass passage 174. However, if the diverter valve is stuck closed in the first position, or if the valve is only partially open, a higher than desired amount of exhaust may be routed through the bypass passage 175. A controller may indicate that the diverter valve 175 is stuck open (in the first position) or partially open (in between the first and second position) responsive to an actual position of the diverter valve 175 estimated by the position sensor 177 differing from the commanded fully closed (second) position.

FIG. 1C shows a schematic view 145 of operation of the exhaust heat exchange system 150 in a third operating mode. Components previously introduced in FIG. 1A are numbered similarly and not reintroduced.

As such, the third operating mode represents a third setting of the diverter valve 175, and the EGR valve 52 that enables exhaust flow control. In the third operating mode, the diverter valve 175 may be in the second (fully closed) position, and the EGR valve 52 may be in the closed position. Due to the fully closed position of the diverter valve 175, exhaust flow from the bypass passage 174 to the main exhaust passage 102 may be disabled. When in the third operating mode, due to the second position of the diverter valve 175, and the closed position of the EGR valve, the entire volume of exhaust exiting the second emissions control device 173 may not enter the bypass passage and may flow directly to the tailpipe 35 via the muffler 172. In this operational mode there is no exhaust flow through the heat exchanger 176, and exhaust heat may not be recovered.

The exhaust heat exchange system 150 may be operated in the third operating mode (as described above) responsive to higher than threshold engine load conditions and after engine warm-up have been completed. During such higher than threshold engine load conditions, EGR may not be requested. Also, since the engine is warm, exhaust heat recovery may not be desired. During operation in the third mode, the plurality of sensors of the heat exchange system, including the temperature sensors 140, 144, and 148, and the pressure sensor 142, may be diagnosed. A detailed description of a diagnostics method for the sensors is discussed in FIG. 5. In the third mode, exhaust may not flow via the bypass passage 174, consequently, the exhaust pressure upstream of the heat exchanger 176 may be substantially equal to the exhaust pressure upstream of the heat exchanger 176, and also the pressure upstream of the heat exchanger 176 may be substantially equal to the atmospheric pressure. Also, in this mode, since exhaust heat is not transfer to the coolant system, the coolant temperature may be maintained below a threshold temperature (such as an expected coolant temperature based on engine operations). While operating in the third mode, degradation of the pressure sensor 142 may be indicated responsive to a higher than threshold pressure difference between the estimated exhaust pressure and atmospheric pressure; degradation of at least one of the first temperature sensor 140 and the second temperature sensor 144 may be indicated responsive to a higher than threshold difference between the first exhaust temperature and the second exhaust temperature; and degradation of the third temperature sensor 148 may be indicated responsive to the estimated coolant temperature being higher than the expected coolant temperature. Each of the threshold temperature difference and the threshold pressure difference may correspond to expected instrumental limitations (error range) of the temperature sensors and the pressure sensor, respectively. The threshold coolant temperature may correspond to an expected coolant temperature when there is no heat transfer from the heat exchanger to the coolant. In this way, the system of FIGS. 1A-1C provide for an engine system comprising: an engine intake manifold, an engine exhaust system with an exhaust passage and a bypass passage, the exhaust passage including one or more exhaust catalysts and a muffler, the bypass passage coupled to the exhaust passage from downstream of the one or more exhaust catalysts to upstream of the muffler, the bypass passage including a heat exchanger, a first temperature sensor coupled to the bypass passage upstream of the heat exchanger for estimating a first exhaust temperature, a second temperature sensor coupled to the bypass passage downstream of the heat exchanger for estimating a second exhaust temperature, a pressure sensor coupled to the bypass passage upstream of the heat exchanger for estimating an exhaust pressure, a coolant system with an incoming coolant line and an outgoing coolant line for circulating coolant through the heat exchanger, the coolant system further coupled to each of an engine block and a heater core, the outgoing coolant line including a coolant temperature sensor for estimating a coolant temperature, a diverter valve coupling an outlet of the bypass passage to the exhaust passage, a position sensor coupled to the diverter valve for estimating a diverter valve position, and an EGR passage with an EGR valve for recirculating exhaust gas from the bypass passage, downstream of the heat exchanger, to the intake manifold. The engine system further comprises a controller with computer readable instructions stored on non-transitory memory for: shifting the diverter valve to a first position and closing the EGR valve to operate the exhaust system in a first mode with exhaust flowing from downstream of the exhaust catalyst to upstream of the muffler via the bypass passage, shifting the diverter valve to a second position and opening the EGR valve to operate the exhaust system in a second mode with exhaust flowing from the bypass passage to the engine intake manifold via the EGR passage, shifting the diverter valve to a second position and closing the EGR valve to operate the exhaust system in a third mode with exhaust flowing directly from downstream of the exhaust catalyst to upstream of the muffler bypassing the heat exchanger, and while operating in one of the first mode and the second mode, indicating degradation of the heat exchanger responsive to each of a difference between the first temperature and the second temperature being higher than a threshold difference, and the second temperature being lower than a threshold temperature; and responsive to the indication of degradation, transitioning to the third mode.

Figure 2:
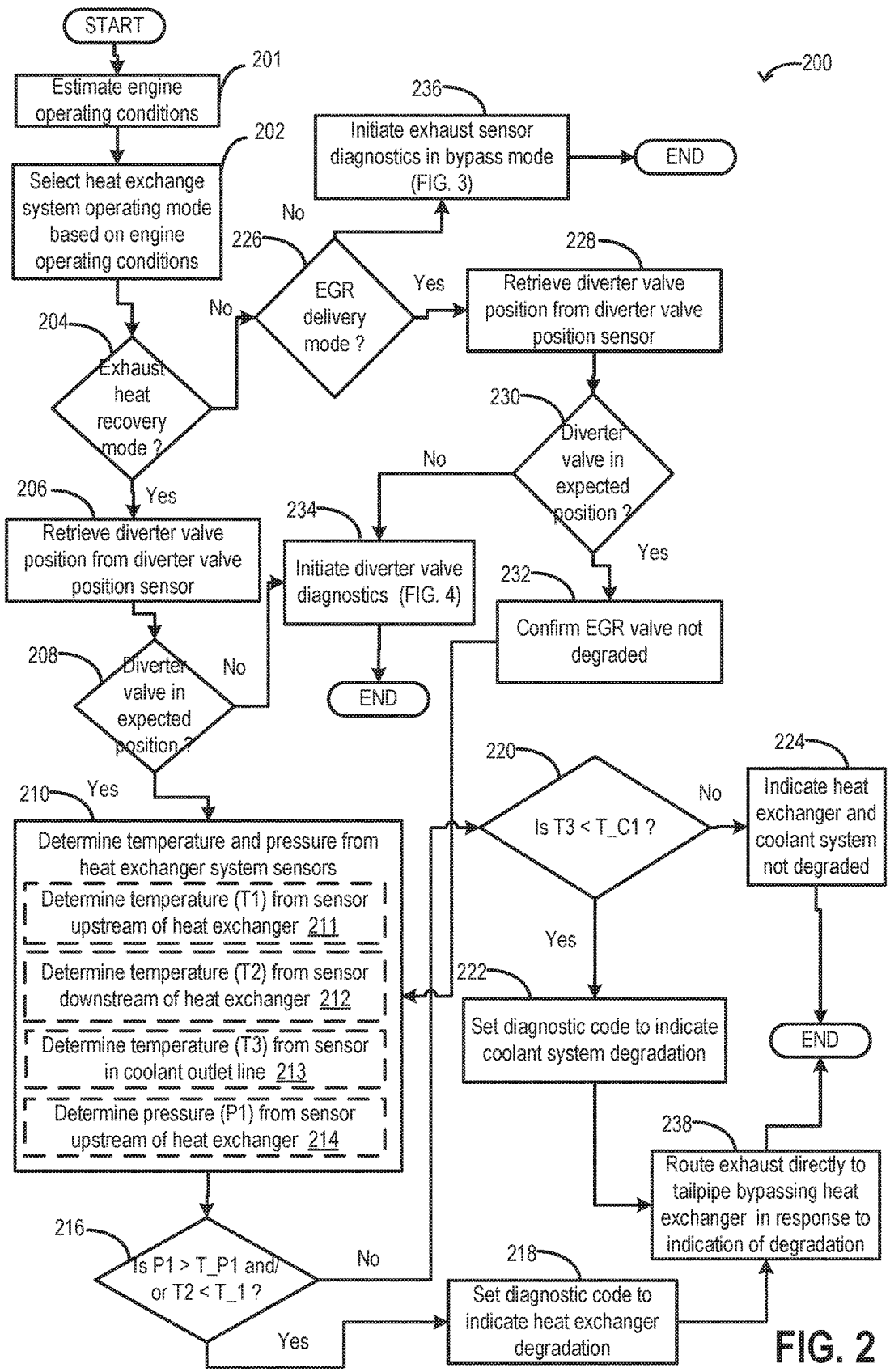
FIG. 2 shows a flow chart illustrating an example method that may be implemented for diagnostics of the heat exchange system of FIGS. 1A-1C.

FIG. 2 illustrates a first example method 200 that may be implemented for on-board diagnostics of a plurality of components of an exhaust heat exchange system (such as exhaust heat exchange system 150 of FIGS. 1A-1C) including a heat exchanger (such as heat exchanger 176 of FIGS. 1A-1C) and a coolant system (such as coolant system 155 of FIGS. 1A-1C). Instructions for carrying out method 200 and the rest of the methods included herein may be executed by a controller based on instructions stored on a memory of the controller and in conjunction with signals received from sensors of the engine system, such as the sensors described above with reference to FIGS. 1A-1C. The controller may employ engine actuators of the engine system to adjust engine operation, according to the methods described below.

At 201, the routine includes estimating and/or measuring engine operating conditions. Conditions assessed may include, for example, engine temperature, engine load, driver torque demand, engine speed, throttle position, exhaust pressure, exhaust air/fuel ratio, ambient conditions including ambient temperature, pressure, and humidity, MAP, MAF, boost, etc.

At 202, the controller may select an operating mode of the heat exchange system based on the determined engine operating conditions. Selecting the operating mode includes determining if engine heating is required based on engine temperature, ambient temperature, and/or exhaust catalyst temperature. In one example, engine heating is required during conditions when the engine temperature is low (e.g., below the activation temperature of an exhaust catalyst), such as during an engine cold-start condition. Selecting the operating mode further includes determining if EGR is required based on engine speed-load and exhaust $NO_x$ levels. In one example, EGR demand increases in the low-mid engine speed-load region, and then tapers off in the mid-high engine speed-load region. Selecting the operating mode may further include determining if cabin heating is desired, such as when the ambient temperature is low. Based on the engine heating demand relative to the EGR demand, the heat exchange system may be operated to provide only EGR, only exhaust heat recovery, or both EGR and exhaust recovery concurrently. The heat exchange system may be operated in one of a plurality of modes by an EGR valve (such as EGR valve 52 in FIGS. 1A-1C) and a diverter valve (such as diverter valve 175 in FIGS. 1A-1C) coupled to a junction of the main exhaust passage and a bypass passage (such as bypass passage 174 in FIGS. 1A-1C) housing a heat exchanger (such as heat exchanger 176 in FIGS. 1A-1C).

At 204, the routine includes determining if the first (exhaust heat recovery only) mode was selected. The exhaust heat exchange system may be operated in the first mode during cold start conditions when exhaust heat recovery for engine and cabin heating is desired. In the first, exhaust heat recovery mode (as discussed in relation to FIG. 1A), the exhaust heat exchange system is operated with the diverter valve commanded to a first open position and the EGR valve actuated closed so that the entire volume of exhaust from the main exhaust passage may be routed to the tailpipe via the bypass passage housing the heat exchanger and EGR may not be delivered to the engine intake manifold. If it is confirmed that the system is operating in the exhaust heat recovery (first) mode, the routine moves on to 206 to retrieve an actual position of the diverter valve based on input from a high resolution position sensor (such as position sensor 177 in FIGS. 1A-1C) coupled to the diverter valve.

At 208, the routine includes determining if the diverter valve is in the expected (commanded) position. During operation in the exhaust heat recovery mode, the diverter valve may be commanded to a first, open position to enable exhaust flow from downstream of the exhaust catalysts to the tailpipe via the heat exchanger (but not directly to the tailpipe). If it is determined that the diverter valve is not in the expected (first) position, it may be inferred that the diverter valve may be degraded. At 234, a diagnostic routine may be initiated to diagnose the diverter valve based on the actual position relative to the commanded position, as detailed at FIG. 4.

If it is determined that the diverter valve is in the expected (first) position, the heat exchanger may be diagnosed. At 210, the controller may determine temperature and pressure values at different locations of the heat exchange system based on inputs from the plurality of exhaust heat exchange system sensors. This includes, at 211, estimating a first exhaust temperature (T1) at the bypass passage (upstream of the heat exchanger) via the first temperature sensor (such as temperature sensor 140 in FIGS. 1A-1C) coupled to the bypass passage, upstream of the heat exchanger. This further includes, at 212, estimating a second exhaust temperature (T2) at the bypass passage (downstream of the heat exchanger) via the second temperature sensor (such as temperature sensor 144 in FIGS. 1A-1C) coupled to the bypass passage downstream of the heat exchanger. Further, at 213, a coolant temperature (T3) at the outlet coolant line, as measured by the temperature sensor (such as temperature sensor 148 in FIGS. 1A-1C) coupled to the outlet coolant line, may be determined. Furthermore, at 214, an exhaust pressure (P1) may be estimated at the bypass passage (upstream of the heat exchanger) via the pressure sensor (such as pressure sensor 142 in FIGS. 1A-1C) coupled to the bypass passage upstream of the heat exchanger.

At 216, the routine includes comparing the temperature and pressure estimated at the upstream location (upstream of the heat exchanger) to corresponding thresholds. In particular, it may be determined if the estimated exhaust pressure (P1) is higher than a threshold pressure (T_P2). The threshold pressure may correspond to an expected exhaust pressure (P) in the bypass passage when the heat exchanger is not clogged and when exhaust can flow through the bypass passage and return to the main exhaust passage. The expected exhaust pressure may be determined via an algorithm that uses engine speed-load and combustion air-fuel ratio as inputs. As such, when the heat exchanger is not clogged, the pressure of exhaust in the bypass passage may equilibrate with the pressure of exhaust in the main passage, which may be at or around barometric pressure. It may be further determined if the estimated second exhaust temperature (T2) is lower than a first threshold temperature (T_1). The first threshold temperature may correspond to an expected temperature of the exhaust (expected second exhaust temperature) after the exhaust is cooled by the heat exchanger. The expected cooling of the exhaust upon passage through the heat exchanger may be based on the exhaust flow rate, the cooling rate higher at lower exhaust flow rates.

In addition to comparing the pressure and temperature to corresponding thresholds, the routine may include determining if a difference (DT) between the first exhaust temperature (T1) estimated upstream of the heat exchanger and the second exhaust temperature (T2) estimated downstream of the heat exchanger is higher than a threshold temperature difference. The threshold temperature difference may be an expected drop in exhaust temperature as exhaust flows through the heat exchanger. The expected second exhaust temperature and the expected drop in exhaust temperature may be modeled based on one or more of engine load, engine temperature, engine speed, exhaust flow-rate, and coolant flow-rate through the heat exchanger. In one example, the expected drop in exhaust temperature may be higher with increase in coolant flow-rate through the heat exchanger and a decrease in engine load, engine temperature, engine speed, and exhaust flow-rate. In another example, the expected drop in exhaust temperature may be lower with a decrease in coolant flow-rate through the heat exchanger and an increase in engine load, engine temperature, engine speed, and exhaust flow-rate. If it is determined that P1 is higher than T_P2, it may be inferred that due to a clogging of the heat exchanger, exhaust is not able to flow through the heat exchanger and consequently there is a pressure build up upstream of the heat exchanger. Simultaneously, if T2 is lower than T_1, it may be inferred that due to heat exchanger clogging, exhaust flow downstream of the heat exchanger is limited causing a decrease in temperature to below the threshold temperature. Also, a higher than threshold difference between T1 and T2 may also indicate that exhaust is not flowing through the heat exchanger. Therefore responsive to one or more of the second exhaust temperature being lower than an expected second exhaust temperature, the difference between the first exhaust temperature and the second exhaust temperature being higher than a threshold temperature difference, and the exhaust pressure being higher than an expected exhaust pressure, at 218, it may be inferred that there is degradation of the heat exchanger and a diagnostic code may be set indicating the degradation. Also following the detection of degradation, at 238, exhaust may no longer be routed through the bypass passage and the heat exchanger. Responsive to the indication of degradation of the heat exchanger, the diverter valve may be shifted to the fully closed (second) position and the EGR valve may be closed to disable exhaust flow through the exhaust bypass and to only enable direct exhaust flow to the tailpipe bypassing the heat exchanger.

If at 216 it is determined that the exhaust pressure is lower than the threshold pressure (T_P), the second exhaust temperature is higher than the threshold temperature (T_1), and the difference between the first exhaust temperature and the second exhaust temperature is lower than the threshold difference, the routine may proceed to step 220. At 220, the routine includes determining if the coolant temperature at the coolant outlet (T3) is lower than a threshold coolant temperature (T_C1). The threshold coolant temperature may correspond to an expected temperature of the coolant after transfer of exhaust heat from the exhaust to the coolant at the heat exchanger. As heat is transferred to the circulating coolant (at the heat exchanger), the temperature of the coolant may increase. The expected coolant temperature may be modeled based on one or more of exhaust temperature, exhaust flow-rate, and coolant flow-rate. In one example, the expected coolant temperature may be lower with an increase in coolant flow-rate and a decrease in engine temperature, exhaust flow-rate. In another example, the expected coolant temperature may be higher with a decrease in coolant flow-rate and an increase in engine temperature, exhaust flow-rate.

If it is determined that the coolant temperature (T3) is higher than the threshold coolant temperature (T_C1), it may be inferred that heat transfer from the exhaust to the coolant system at the heat exchanger is taking place. Therefore, at 224, it may be indicated that the heat exchanger and the coolant system are not degraded. However, if it is determined that T3 is lower than T_C1, it may be inferred that the coolant system is unable to absorb heat from the exhaust at the heat exchanger. Therefore, at 222, a diagnostics code may be set indicating a degradation of the coolant system. The indication may include indicating one or more coolant lines are clogged or pinched. Following the detection of coolant system degradation, at 238, the exhaust may be directly routed to the tailpipe bypassing the heat exchanger.

Returning to 204, if the first mode is not selected, at 226, the routine includes determining if the second, EGR delivery mode was selected. The exhaust heat exchange system may be operated in the second mode when EGR is requested and when further exhaust heat recovery for engine and passenger cabin heating is not requested. In the EGR delivery mode, the heat exchange system is operated with the diverter valve in a second closed position and the EGR valve open so that an amount of exhaust can be routed from the exhaust manifold to the engine intake manifold via the bypass passage, the heat exchanger, the EGR delivery passage, and the EGR valve. In this second mode, exhaust entering the bypass passage may not return to the main exhaust passage. If it is determined that the exhaust heat exchange system is operating in the EGR delivery (second) mode, at 228, the controller may retrieve the actual position of the diverter valve based on inputs from the high resolution position sensor coupled to the diverter valve.

At 230, the routine includes determining if the diverter valve is in the expected (commanded) position. During operation in the EGR delivery mode, the diverter valve may be commanded to a second position to enable exhaust flow to the engine intake manifold via the heat exchanger. If it is determined that the diverter valve is not in the expected (second) position, it may be inferred that there may be a degradation of the diverter valve. At 234, a diagnostic routine may be initiated to diagnose the diverter valve. Details of the diverter valve diagnostics is described in FIG. 4.

If it is confirmed that the diverter valve is in the expected position, at 232, the controller may confirm that the EGR valve is not degraded. EGR valve operation may be monitored based on EGR flow rate as estimated using a differential pressure feedback sensor across an orifice in the EGR delivery passage. Once it is confirmed that the EGR valve is functional, the routine may proceed to step 210 to continue with heat exchanger and coolant system diagnostics. Therein, as described above, degradation of the heat exchanger may be indicated in response to a higher than threshold difference between exhaust temperature upstream of the heat exchanger and exhaust temperature downstream of the heat exchanger, and degradation of the coolant system may be indicated in response to a lower than threshold coolant temperature.

If at 226 it is determined that the exhaust heat exchange system is not operating in the EGR delivery mode, at 236, it may be confirmed that the system is operating in the heat exchanger bypass (third) mode. The exhaust heat exchange system may be operated in the third operating mode during higher than threshold engine load conditions when exhaust heat recovery is not requested. In the third exhaust heat exchanger bypass mode (as discussed in relation to FIG. 1C), the heat exchange system may be operated with the diverter valve in the second position and the EGR valve closed. During operation in the bypass mode, diagnostics of the exhaust heat exchange system sensors may be carried out. Details of the diagnostics of the exhaust heat exchange system sensors is discussed in FIG. 3.

In this way, diagnostics of the heat exchanger and the coolant system may be carried out periodically (after a threshold time has elapsed or a threshold distance has been travelled since the last diagnostic routine) or opportunistically during operation of the heat exchange system in the first mode or the second mode.

Figure 3:
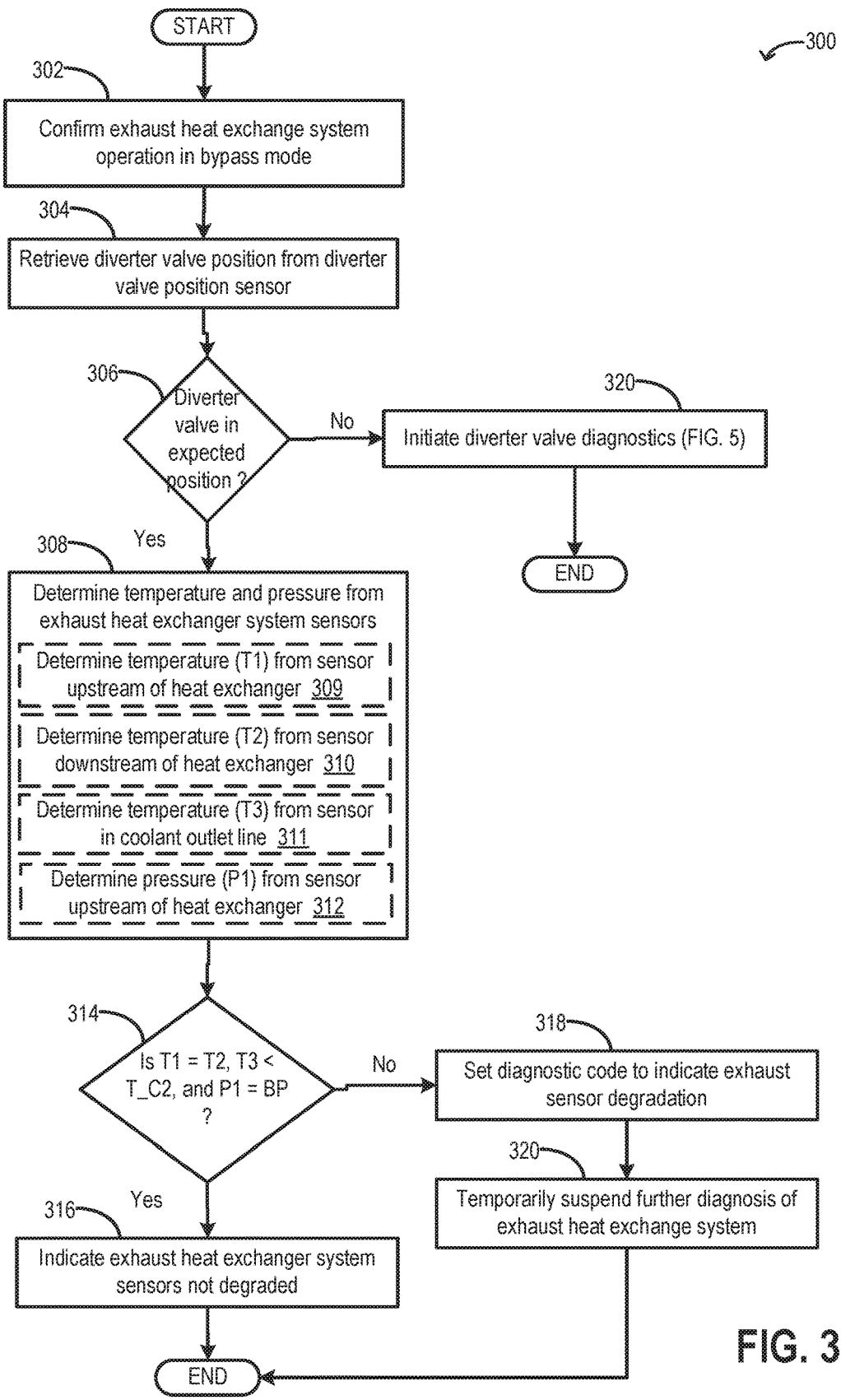
FIG. 3 shows a flow chart illustrating an example method that may be implemented for diagnostics of sensors coupled to the heat exchange system of FIGS. 1A-1C.

FIG. 3 illustrates an example method 300 that may be implemented for on-board diagnostics of a plurality of sensors coupled to the exhaust heat exchange system of FIGS. 1A-1C. The diagnostics routine may monitor the health of each of a temperature sensor (such as temperature sensor 140 in FIGS. 1A-1C) coupled to the bypass passage upstream of the heat exchanger, a temperature sensor (such as temperature sensor 144 in FIGS. 1A-1C) coupled to the bypass passage downstream of the heat exchanger, a temperature sensor (such as temperature sensor 148 in FIGS. 1A-1C) coupled to an outlet coolant line, and a pressure sensor (such as pressure sensor 142 in FIGS. 1A-1C) coupled to the bypass passage upstream of the heat exchanger.

At 302, the controller may confirm that the exhaust heat exchange system is operating in the heat exchanger bypass (third) mode. As described in FIG. 1C, the system is operated in the third mode during higher than threshold engine load conditions when exhaust gas recirculation (EGR) and exhaust heat recovery are no longer desired. At 304, the controller may retrieve the position of the diverter valve based on inputs from a high resolution position sensor (such as position sensor 177 in FIGS. 1A-1C) coupled to the diverter valve.

At 306, the routine includes determining if the actual position of the diverter valve matches the expected (commanded) position. In the bypass mode, the expected position is the second fully closed position of the diverter valve. Also, the EGR valve may be closed to enable exhaust flow directly to the tailpipe. If it is determined that the diverter valve is not in the expected (second) position, such as when the actual position of the diverter valve includes the first position, or a position in between the first and second position, it may be inferred that the diverter valve is degraded. At 320, a diagnostic routine may be initiated to diagnose the degradation of diverter valve, for example, to determine if it is stuck open or closed. Details of the diverter valve diagnostics while operation in the bypass mode is described in FIG. 5.

If it is confirmed that the diverter valve is in the expected position, at 308, the controller may retrieve temperature and pressure values of the heat exchange system from the plurality of exhaust heat exchange system sensors. At 309, a first exhaust temperature (T1) as measured by the temperature sensor coupled to the bypass passage upstream of the heat exchanger may be determined. At 310, a second exhaust temperature (T2) as measured by the temperature sensor coupled to the bypass passage downstream of the heat exchanger may be determined. At 311, a coolant temperature (T3) as measured by the temperature sensor coupled to the outlet coolant line may be determined. At 312, an exhaust pressure (P1) as measured by the pressure sensor coupled to the bypass passage upstream of the heat exchanger may be determined.

At 314, the routine includes determining if the first exhaust temperature (T1) is substantially equal to the second exhaust temperature (T2) such as when there is a lower than threshold difference between the first exhaust temperature and the second exhaust temperature. The controller may also determine if the pressure upstream of the heat exchanger (P1) is substantially equal to the atmospheric pressure (BP) such as when there is a lower than threshold difference between P1 and BP. Also, it may be determined if the coolant temperature is lower than a threshold coolant temperature (T_C2). Since in the third mode, exhaust does not enter the bypass passage, a temperature estimated upstream of the heat exchanger may be in equilibrium with the temperature estimated downstream of the heat exchanger, and the pressure in the bypass passage may be in equilibrium with the atmospheric pressure. Each of the threshold temperature difference and the threshold pressure difference may correspond to expected instrumental limitations (error range) of the temperature sensors and the pressure sensor, respectively. The threshold coolant temperature may correspond to an expected coolant temperature when there is no heat transfer from the heat exchanger to the coolant.

If is determined that each of T1 is equal to T2 (or there is a lower than threshold difference between T1 and T2), T3 is lower than T_C2, and P1 is equal to BP (or there is a lower than threshold difference between P1 and BP), at 316, it may be inferred that the exhaust heat exchange system temperature and pressure sensors are not degraded.

If it is determined that T1 is not equal to T2, at 318, degradation of at least one of the first temperature sensor and the second temperature sensor may be indicated. Based on an absolute temperature difference between the first temperature (T1) and the second temperature (T2) being higher than a threshold temperature difference, a diagnostic code may be set. Also, if it is determined that T3 is higher than T_C2, degradation of the coolant temperature sensor may be indicated. If it is determined that P1 is not equal to BP, degradation of the pressure sensor may be indicated. Based on the absolute difference between the estimated exhaust pressure and the atmospheric pressure being higher than a threshold pressure difference, a diagnostic code may be set. If degradation of one or more exhaust heat exchange system sensors is detected, the sensors may no longer be used for effective diagnostics of the heat exchanger system. Therefore, at 320, further diagnostics of the exhaust heat exchange system may be temporarily suspended until functionality of the sensors is restored (such as during a subsequent servicing).

In this way, while operating in the third mode, degradation of the pressure sensor may be indicated responsive to a higher than threshold pressure difference between the exhaust pressure and atmospheric pressure, degradation of at least one of the first temperature sensor and the second temperature sensor may be indicated responsive to a higher than threshold difference between the first exhaust temperature and the second exhaust temperature, and degradation of the third temperature sensor may be indicated responsive to a higher than threshold coolant temperature. On-board diagnostics of the heat exchange system sensors may be carried out periodically or opportunistically during operation of the heat exchange system in the third mode.

Figure 4:
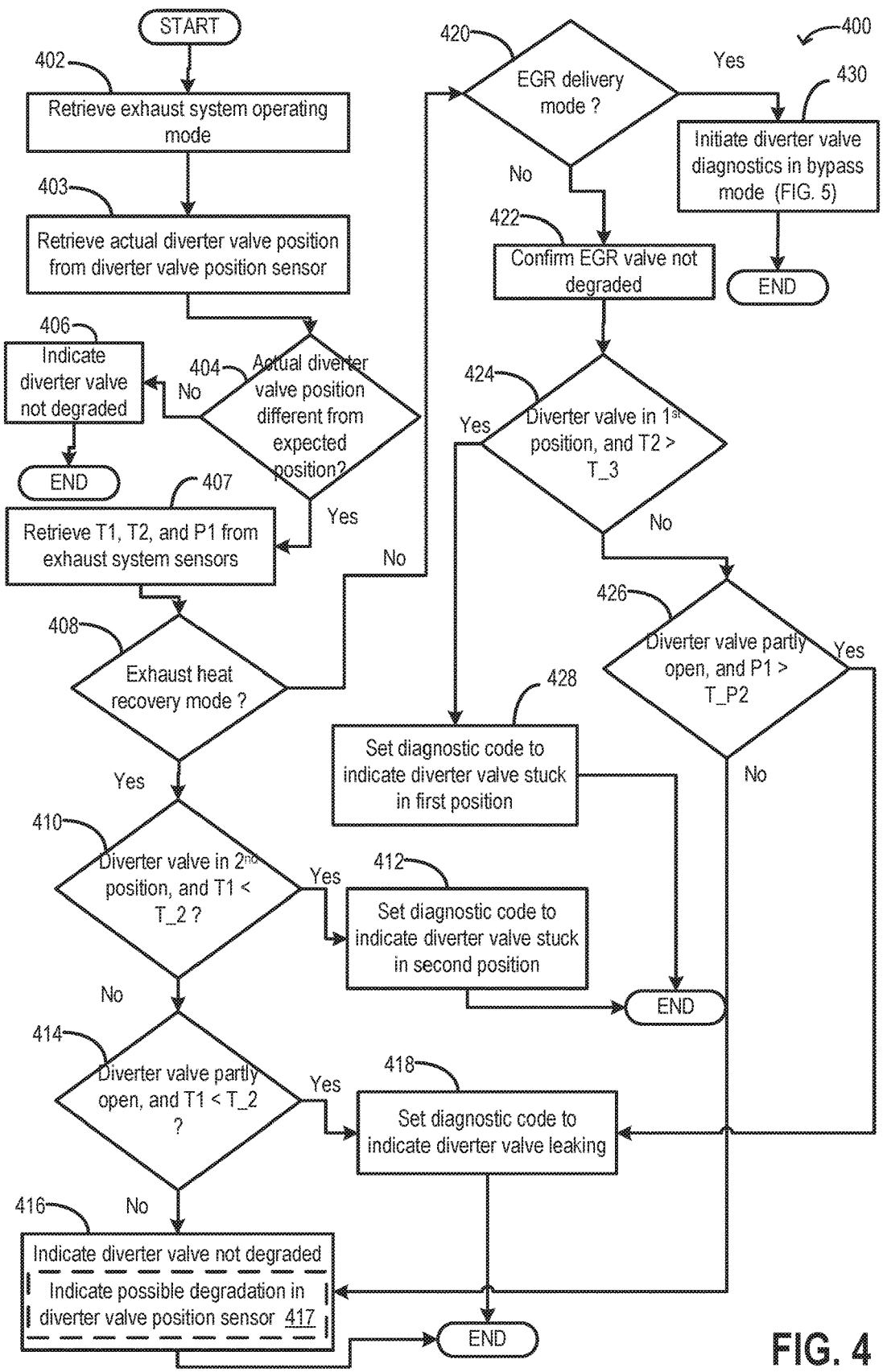
FIG. 4 shows a flow chart illustrating a first example method that may be implemented for diagnostics of an exhaust system diverter valve.

FIG. 4 illustrates an example method 400 that may be implemented for diagnosing the diverter valve of the exhaust heat exchange system.

At 403, the actual position of the diverter valve may be retrieved based on inputs from the position sensor coupled to the diverter valve. At 404, the routine includes determining if the actual position of the diverter valve is different from the commanded position of the diverter valve. As an example, during operation of the heat exchange system in the first, heat recovery mode, the diverter valve may be commanded to the first fully open position and the EGR valve may be closed to enable exhaust flow to the tailpipe via the heat exchanger. If during the first mode, the actual position of the diverter valve includes the second position, or a position in between the first and second positions, diverter valve degradation may be determined. In comparison, during operation of the heat exchange system in the second, EGR delivery mode, the diverter valve may be commanded to the second fully closed position and the EGR valve may be opened to enable exhaust flow to the engine intake manifold via the heat exchanger. During operation of the heat exchange system in the third, bypass mode, the diverter valve may also be commanded to the second position and the EGR valve may be closed to enable direct exhaust flow to the tailpipe, bypassing the heat exchanger. If during the second or third mode, the actual position of the diverter valve includes the first position, or a position in between the first and second positions, diverter valve degradation may be determined.

If it is determined that the actual position of the diverter valve matches the commanded position of the diverter valve, at 406, it may be indicated that the diverter valve is not degraded and may continue to be used for adjusting operation of the exhaust heat exchange system.

If it is determined that the actual position of the diverter valve is different from the commanded position, at 407, the controller may retrieve each of a first exhaust temperature (T1) as estimated by the temperature sensor coupled to the bypass passage upstream of the heat exchanger, a second exhaust temperature (T2) as estimated by the temperature sensor coupled to the bypass passage downstream of the heat exchanger, and an exhaust pressure (P1) as estimated by the temperature sensor coupled to the bypass passage upstream of the heat exchanger.

At 408, the routine includes determining if the exhaust heat exchange system is operating in the exhaust heat recovery (first) mode. If it is confirmed that the system is operating in the exhaust heat recovery (first) mode, at 410, the routine may include determining if the diverter valve is in the expected, second position, and if the first exhaust temperature is lower than a threshold temperature T_2. The threshold temperature T_2 may correspond to an expected exhaust temperature at the bypass passage upstream of the heat exchanger when the entire volume of exhaust flows through the bypass passage (such as during operation in the first mode). The threshold temperature T_2 may be modeled based on one or more of engine load, engine temperature, engine speed, and exhaust flow-rate.

If it is determined that the diverter valve is in the second position (actual position) during operation in the first mode, and that T1 is lower than the T_2, at 412, it may be inferred that the diverter valve is stuck in the second fully closed position and exhaust may not be entering the exhaust bypass. At 418, a diagnostic code may be set indicating that the diverter valve is stuck closed and the exhaust heat exchange system may no longer be operated in the first mode until the diverter valve has been serviced.

If it is determined that the diverter valve is not in the second position, at 414, the routine includes determining if the diverter valve is partially open (in between the first and the second position) and if the first exhaust temperature (T1) is lower than the threshold temperature T_2. When the diverter valve is stuck in between the first and the second position, exhaust may flow through the main exhaust passage and may not enter the bypass passage. If it is determined that the diverter valve is in a partly open position during operation in the first mode and that T1 is lower than the threshold T_2, at 418, it may be inferred that the diverter valve is leaking as it is stuck in-between the first and the second position and the entire volume of exhaust may not be entering the exhaust bypass (as desired during operation in the first mode). A diagnostic code may be set and the exhaust heat exchange system may no longer be operated in the first mode until the diverter valve has been serviced.

If it is determined that the diverter valve is not partly open and is not in the second position, at 416, it may be inferred that the diverter valve is not degraded and is functioning. Alternatively, at 417, it may be indicated that there is a possible degradation in the diverter valve position sensor and the sensor may not be able to optimally estimate the actual position of the diverter valve.

If at 408 it is determined that the exhaust heat exchange system is not operating in the exhaust heat recovery mode, at 420, the routine includes determining if the exhaust heat exchange system is operating in the EGR delivery (second) mode. If it is confirmed that the exhaust heat exchange system is operating in the EGR delivery (second) mode, at 422, the controller may confirm that the EGR valve is not degraded. EGR valve operation may be monitored based on EGR flow rate. Once it is confirmed that the EGR valve is fully functional, the routine may proceed to step 424 to continue with diverter valve diagnostics while operating in the EGR mode.

At 424, the routine includes determining if the diverter valve is in the first position, and if the second exhaust temperature (T2) is higher than a threshold temperature T_3. The threshold temperature T_3 may correspond to an expected exhaust temperature at the bypass passage downstream of the heat exchanger when a desired amount of exhaust (as EGR) flows through the bypass passage (such as during operation in the first mode) before entering the EGR delivery passage. The threshold temperature T_3 may be modeled based on one or more of engine load, engine temperature, engine speed, exhaust flow-rate, and coolant flow-rate through the heat exchanger.

If it is determined that the diverter valve is in the first position during operation in the second mode, and that T2 is higher than the threshold temperature T_3, at 428, it may be inferred that the diverter valve is stuck in the first position and the entire volume of exhaust may be entering the exhaust bypass (instead of a part of the exhaust being routed directly to the tailpipe). The higher than desired volume of exhaust may enter the EGR passage causing combustion instability. A diagnostic code may be set indicating that the diverter valve is stuck open and the exhaust heat exchange system may no longer be operated in the second mode until the diverter valve has been serviced.

If it is determined that the diverter valve is not in the first position, at 426, the routine includes determining if the diverter valve is partially open (in between the first and the second position) and if exhaust pressure is higher than a threshold pressure T_P2. When the diverter valve is partly open (between first and second positions), a higher than estimated amount of exhaust may enter the bypass passage and may flow through the EGR delivery passage or return to the main exhaust passage. If the higher than expected amount of exhaust enters the bypass passage, the pressure upstream of the heat exchanger may increase. The threshold T_P2 may correspond to a pressure in the bypass passage generated by an expected amount of exhaust entering the bypass passage for EGR. The threshold pressure T_P2 may be modeled based on one or more of engine load, engine temperature, engine speed, and exhaust flow-rate.

If it is determined that the diverter valve is in a partly open position during operation in the second mode, and that P1 is higher than the threshold T_P2, the routine may move to 418 and it may be inferred that the diverter valve is leaking as it is stuck between the first and the second position. A diagnostic code may be set indicating the leak and the exhaust heat exchange system may no longer be operated in the second mode until the diverter valve has been repaired. If it is determined that the diverter valve is not in a partly open position, and that P1 is lower than the threshold T_P2, the routine may proceed to 416 and it may be indicated that the diverter valve is not degraded.

If at 420 it is determined that the exhaust heat exchange system is not operating in the EGR delivery mode, at 430, it may be inferred that the system is operating in the heat exchanger bypass (third) mode. During operation in the bypass mode, diagnostics of the diverter valve may also be carried out. Details of the diagnostics of the diverter valve while operating in the bypass mode is discussed in FIG. 5.

Figure 5:
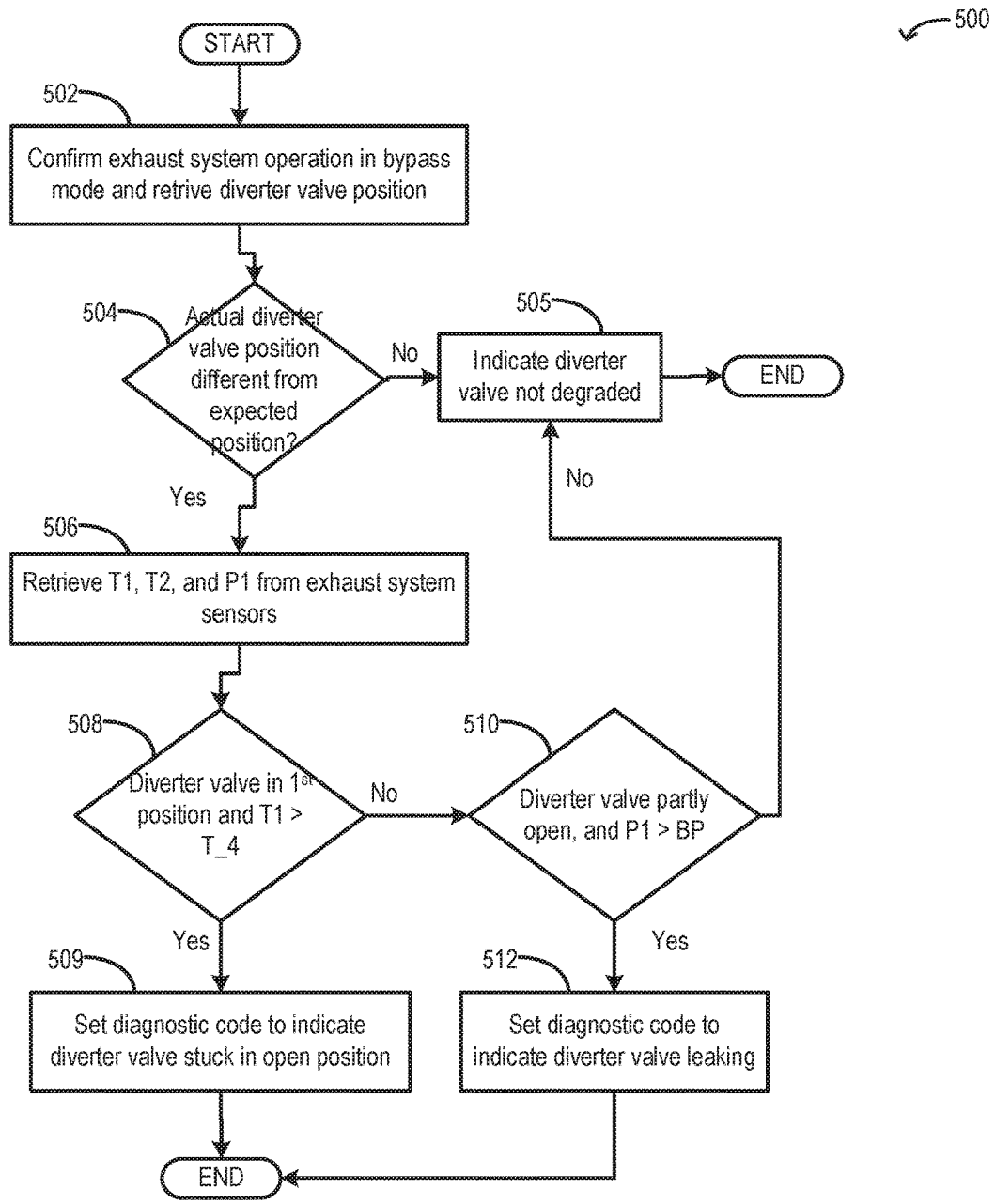
FIG. 5 shows a flow chart illustrating a second example method that may be implemented for diagnostics of an exhaust system diverter valve.

FIG. 5 illustrates an example method 500 that may be implemented for diagnosing the diverter valve of the exhaust heat exchange system during operation of the heat exchange system in the heat exchanger bypass mode. During operation in the bypass mode, the diverter valve may be in the second position and the EGR valve may be closed such that the exhaust may not enter the bypass passage and may flow directly to the tailpipe through the main exhaust passage. The example method 500 may be implemented at step 430 of FIG. 4.

At 502, the controller may confirm that the exhaust heat exchange system is operating in the heat exchanger bypass (third) mode. Also, the controller may retrieve the actual position of the diverter valve based on input from a high resolution position sensor coupled to the diverter valve.

At 504, the routine includes determining if the actual position of the diverter valve is different from the commanded position of the diverter valve. As an example, during operation of the heat exchange system in the bypass mode, the diverter valve may be commanded to the second position and the EGR valve may be closed to enable direct exhaust flow to the tailpipe, bypassing the heat exchanger.

If it is determined that the actual position of the diverter valve is the same as the commanded position of the diverter valve, at 505, it may be indicated that the diverter valve is not degraded and may be continue to be used for adjusting operation of the exhaust heat exchange system.

At 506, the controller may retrieve each of a first exhaust temperature (T1) as estimated by the temperature sensor coupled to the bypass passage upstream of the heat exchanger, a second exhaust temperature (T2) as estimated by the temperature sensor coupled to the bypass passage downstream of the heat exchanger, and an exhaust pressure (P1) as estimated by the temperature sensor coupled to the bypass passage upstream of the heat exchanger.

At 508, the routine includes determining if the diverter valve is in the first position and if the first exhaust temperature (T1) is higher than a threshold temperature T_4. In the bypass mode, since exhaust may not enter the bypass passage, the threshold temperature T_4 may correspond to an expected temperature of the bypass passage without any exhaust flowing through it.

If it is determined that the diverter valve is in the first position even during operation in the third mode, and that T1 is higher than the threshold T_4, at 509, a diagnostic code may be set indicating that the diverter valve is stuck in the first position and instead of flowing directly through the heat exchanger, exhaust may be entering the exhaust bypass.

If it is determined that the diverter valve is not in the first position, at 510, the routine includes determining if the diverter valve is partly open (stuck in between the first and the second position) and if exhaust pressure is higher than atmospheric pressure (BP). When the diverter valve is between first and second position, exhaust may enter the bypass passage and the pressure upstream of the heat exchanger may increase above the atmospheric pressure.

If it is determined that the diverter valve is in a partly open position during operation in the second mode, and that P1 is higher than BP, the routine may move to 512 and it may be inferred that the diverter valve is leaking as it is stuck between the first and the second position and a diagnostic code may be set. If it is determined that the diverter valve is not partly open and is not in the first position, at 505, it may be inferred that the diverter valve is not degraded.

In this way, degradation of the diverter valve may be indicated in response to an estimated diverter valve position being the second position or a position in between the first position and the second position while operating in the first mode. Also, degradation of the diverter valve may be indicated in response to the estimated diverter valve position being the first position or a position in between the first position and the second position during operation in one of the second mode and the third mode.

FIG. 6 shows a table 600 showing diagnostic parameters for different components of the heat exchange system of FIGS. 1A-1C. The heat exchange system may comprise a heat exchanger housed in an exhaust bypass, the exhaust bypass coupled to a main exhaust passage from downstream of the exhaust catalysts to upstream of the muffler. A coolant system with an incoming coolant line and an outgoing coolant line may be fluidically coupled to the heat exchanger. The heat exchange system may further include an exhaust gas recirculation (EGR) passage for recirculating exhaust from the exhaust bypass, downstream of the heat exchanger, to an engine intake manifold via an EGR valve. The controller may adjust the position of a diverter valve coupled to a junction of the main exhaust passage and the exhaust bypass downstream of the heat exchanger to operate the heat exchange system in one of three distinct modes.

In one example, while operating the heat exchange system in a first, heat recovery mode, the controller may actuate the diverter valve to a first (open) position and may close the EGR valve to flow exhaust from downstream of the exhaust catalysts to a tailpipe via the exhaust bypass housing the heat exchanger. In another example, while operating the heat exchange system in a second, EGR mode, the controller may actuate the diverter valve to a second (closed) position and may open the EGR valve to flow exhaust from downstream of the exhaust catalysts to the tailpipe via the exhaust bypass housing a heat exchanger. In yet another example, while operating the heat exchange system in a third, bypass mode, the controller may actuate the diverter valve to the second position and may close the EGR valve to flow exhaust from downstream of the exhaust catalysts directly to the tailpipe bypassing the heat exchanger.

For diagnostics of the heat exchange system, a first exhaust temperature (T1) is estimated via a first temperature sensor housed in the bypass passage upstream of the heat exchanger, a second exhaust temperature (T2) is estimated via a second temperature sensor housed in the bypass passage downstream of the heat exchanger, an exhaust pressure (P1) is estimated via a pressure sensor housed in the bypass passage upstream of the heat exchanger, and a coolant temperature (T3) is estimated via a third temperature sensor housed in a coolant line of the coolant system. The actual position of the diverter valve may be estimated via a high resolution position sensor coupled to the diverter valve.

In row 602, degradation of the heat exchanger may be diagnosed while the heat exchange system operates in either of the first, heat recovery mode and the second, EGR mode. Therein, the diverter valve may be in the first position (during operation in first mode) or in the second position (during operation in second mode). If there is a degradation of the heat exchanger, such as if the heat exchanger is clogged, hot exhaust may accumulate upstream of the heat exchanger and exhaust may not be able to flow through the heat exchanger. Due to degradation of the heat exchanger, the second exhaust temperature (T2) may be lower than an expected second temperature while the first exhaust temperature (T1) may be higher than an expected first temperature and the exhaust pressure (P1) may be higher than an expected pressure. Also, heat may not be transferred to the coolant circulating through the heat exchanger causing the coolant temperature to remain below an expected coolant temperature. The expected first temperature, the expected second temperature, the expected pressure, and the expected coolant temperature may be modeled based on the selected operating mode (first or second mode), engine temperature, engine load, engine speed, exhaust flow-rate, coolant flow-rate, etc.

In row 604, degradation of the coolant system may be diagnosed while the heat exchange system operates in either of the first, heat recovery mode and the second, EGR mode. Therein, the diverter valve may be commanded to the first position (during operation in first mode) or to the second position (during operation in second mode). If there is a degradation of the coolant system, heat from the exhaust may not be transferred to the coolant at the heat exchanger, and the exhaust exiting the heat exchanger may not be significantly cooler than the exhaust entering the heat exchanger. Due to degradation of the coolant system, the second exhaust temperature (T2) may be higher than an expected second temperature while the first exhaust temperature (T1) may be substantially equal an expected first temperature and the exhaust pressure (P1) may be substantially equal to an expected pressure. Also, as heat may not be transferred to the coolant at the heat exchanger, the coolant temperature may remain below an expected coolant temperature. The expected first temperature, the expected second temperature, the expected pressure, and the expected coolant temperature may be modeled based on the operating mode (first or second), engine temperature, engine load, engine speed, exhaust flow-rate, etc.

In row 606, degradation of the diverter valve may be diagnosed while the heat exchange system operates in the first, heat recovery mode. Therein, the diverter valve may be commanded to be in a first position (during operation in first mode). However, if the diverter valve is stuck in the second position (actual position), a substantial amount of exhaust may not enter the bypass passage, and may directly flow to the tailpipe via the main exhaust passage. If the diverter valve is stuck in the second position, during operation in the first mode, due to the lower than expected exhaust flow into the bypass passage, the first exhaust temperature (T1) may be lower than an expected first temperature, the second exhaust temperature (T2) may be lower than an expected second temperature, and the exhaust pressure (P1) may be lower than an expected pressure. Also, as a substantial amount of exhaust may not flow through the heat exchanger, the coolant temperature may be lower than an expected coolant temperature.

In row 608, degradation of the diverter valve may be diagnosed while the heat exchange system operates in either of the second, EGR mode and the third, bypass mode. Therein, the diverter valve may be commanded to be in the second position (during operation in either the second mode or the third mode). However, if the diverter valve is stuck in the first position (actual position), the entire amount of exhaust may enter the exhaust bypass, flow through the heat exchanger and enter the engine intake via the EGR delivery passage. If the diverter valve is stuck in the first position during operation in the EGR mode or the bypass mode, due to the higher than expected exhaust flow into the bypass passage, the first exhaust temperature (T1) may be higher than an expected first temperature, the second exhaust temperature (T2) may be higher than an expected second temperature, and the exhaust pressure (P1) may be higher than an expected pressure. Also, as the entire volume of exhaust may flow through the heat exchanger, the coolant temperature may be higher than an expected coolant temperature.

In row 610, degradation of the diverter valve may be diagnosed while the heat exchange system operates in one of the first, heat recovery mode, the second, EGR mode, and the third, bypass mode. Therein, the diverter valve may be commanded to be either in the first position (during operation in first mode) or in the second position (during operation in second mode). However, during operation in the first mode, if the diverter valve is stuck in between the first position and the second position (in a partly open position), the entire volume of exhaust may not enter the exhaust bypass and a portion of the exhaust may flow to the tailpipe directly via the main exhaust passage (bypassing the heat exchanger). If the diverter valve is stuck in a partly open position, due to the lower than expected exhaust flow into the bypass passage, the first exhaust temperature (T1) may be lower than an expected first temperature, the second exhaust temperature (T2) may be lower than an expected second temperature, and the exhaust pressure (P1) may be lower than an expected pressure. Also, as the entire volume of exhaust may not flow through the heat exchanger, the coolant temperature may be lower than an expected coolant temperature. However, during operation in the second mode or the third mode, if the diverter valve is stuck in between the first position and the second position (in a partly open position), a higher than expected volume of exhaust may enter the exhaust bypass. If the diverter valve is stuck in a partly open position, due to the higher than expected exhaust flow into the bypass passage, the first exhaust temperature (T1) may be higher than an expected first temperature, the second exhaust temperature (T2) may be higher than an expected second temperature, and the exhaust pressure (P1) may be higher than an expected pressure. Also, as a higher than expected volume of exhaust may flow through the heat exchanger, the coolant temperature may be higher than an expected coolant temperature.

In row 612, degradation of at least one of the first temperature sensor coupled to the exhaust bypass upstream of the heat exchanger and the second temperature sensor coupled to the exhaust bypass downstream of the heat exchanger may be diagnosed while the heat exchange system operates in the third, bypass mode. Therein, the diverter valve may be commanded to the second position (during operation in third mode). In this mode, since no exhaust may enter the bypass passage, the first exhaust temperature may be expected to be equal to the second exhaust temperature and the exhaust pressure may be expected to be equal to the atmospheric pressure. If there is a degradation of at least one of the first temperature sensor and the second temperature sensor, the first exhaust temperature may not be substantially equal to the second exhaust temperature while the exhaust pressure may be substantially equal to the atmospheric pressure.

In row 614, degradation of the pressure sensor coupled to the exhaust bypass upstream of the heat exchanger may be diagnosed while the heat exchange system operates in the third, bypass mode. Therein, the diverter valve may be in the second position (during operation in third mode) and exhaust is not expected to enter the bypass passage. If there is a degradation of the pressure sensor, the exhaust pressure may not be substantially equal to the atmospheric pressure while the first exhaust temperature may be substantially equal to the second exhaust temperature.

In this way, on-board diagnostics may be carried out for different components of the exhaust heat exchange system during different operational modes of the heat exchanger system.

Figure 7:
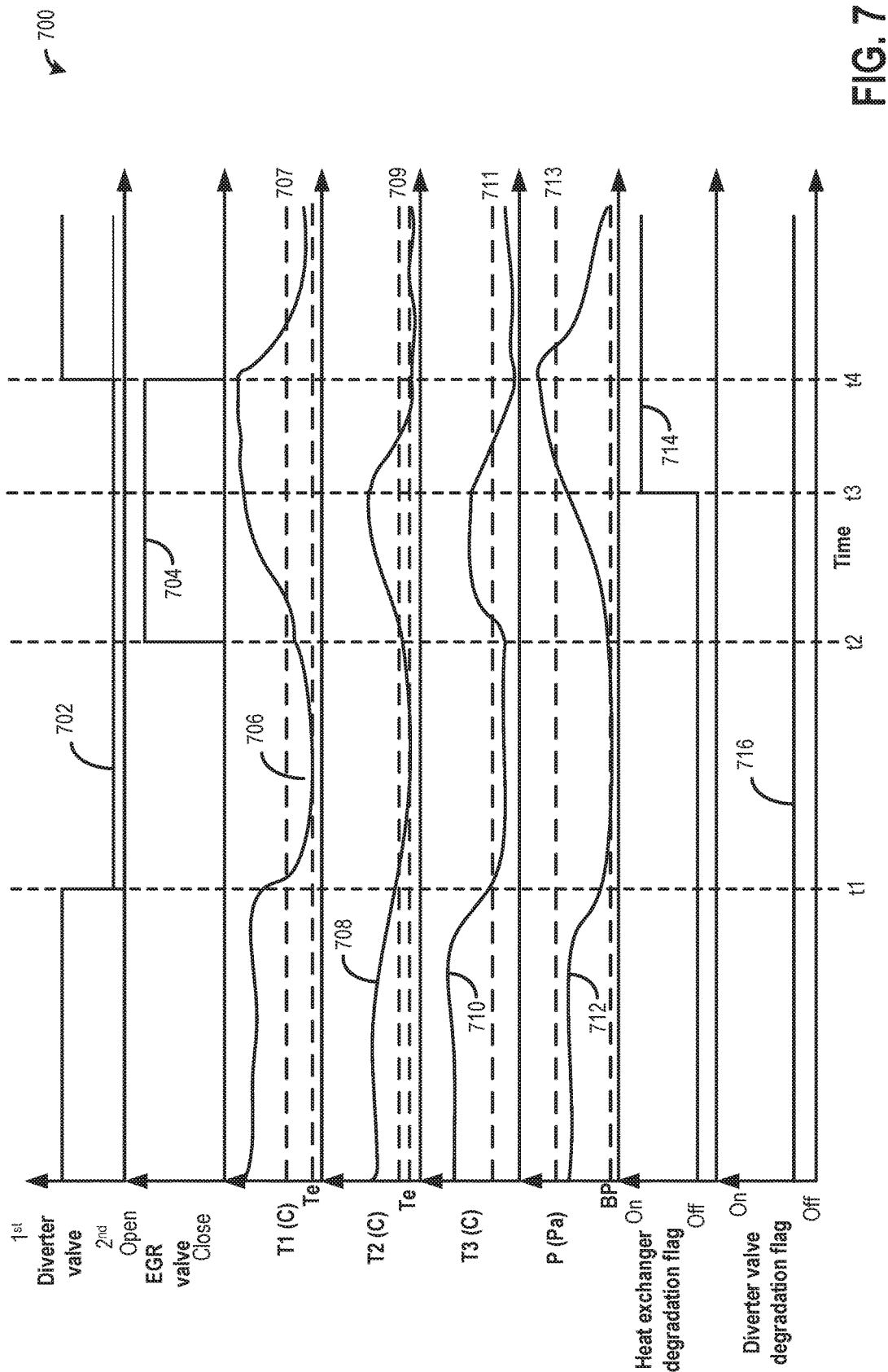
FIG. 7 shows a first example of diagnosing a heat exchanger and a diverter valve of the heat exchange system of FIGS. 1A-1C, according to the present disclosure.

FIG. 7 shows an example operating sequence 700 illustrating a first diagnostic routine for components of the heat exchange system of FIGS. 1A-1C. The diagnostic routine may be periodically and/or opportunistically carried out to monitor degradation of the diverter valve and the heat exchanger of the heat exchange system. The horizontal (x-axis) denotes time and the vertical markers t1-t4 identify significant times in the operation of the exhaust bypass assembly system.

The first plot, line 702, shows an actual position of a diverter valve coupled to a junction of the main exhaust passage and the bypass passage housing the heat exchanger, as estimated via a position sensor coupled to the diverter valve. The second plot, line 704, shows a position of an exhaust gas recirculation (EGR) valve coupled to an EGR delivery passage delivering exhaust from the exhaust passage to the intake manifold. The third plot, line 706, shows a first exhaust temperature upstream of the heat exchanger as estimated via a first temperature sensor coupled to the bypass passage. Dotted line 707 shows a first threshold (expected) temperature below which it may be inferred that any exhaust does not enter the bypass passage. The fourth plot, line 708, shows a second exhaust temperature downstream of the heat exchanger as estimated via a second temperature sensor coupled to the bypass passage. Dotted line 709 shows a second threshold (expected) temperature below which it may be inferred that any exhaust does not flow through the heat exchanger. The fifth plot, line 710, shows coolant temperature in the outgoing coolant line coupled to the heat exchanger as estimated via a third temperature sensor coupled to the coolant line. Dotted line 711 shows a coolant temperature which may denote an expected coolant temperature after absorbing an expected amount of heat from the exhaust at the heat exchanger. The sixth plot, line 712, shows exhaust pressure upstream of the heat exchanger as estimated via a pressure sensor coupled to the bypass passage. Dotted line 713 shows a threshold pressure which may denote an exhaust pressure estimated at the bypass passage upstream of the heat exchanger when there is an accumulation of exhaust in the bypass passage due to clogging of the heat exchanger. The seventh plot, line 714, shows position of a heat exchanger degradation indicator flag, and the eighth plot, line 716, shows a position of a diverter valve degradation indicator flag.

Prior to time t1, responsive to engine cold-start conditions, the diverter valve may be commanded to a first position and the EGR valve may be commanded closed to flow the entire volume of exhaust from the main exhaust passage to the tailpipe via the heat exchanger without entering the EGR delivery passage. During the cold-start conditions, exhaust heat recovery is requested and EGR is not desired. During this time, as exhaust flows through the bypass passage with the heat exchanger, the first exhaust temperature and the second exhaust temperature may be above their respective threshold temperatures. The second exhaust temperature may be lower than the first exhaust temperature as the exhaust gets cooled upon flowing through the heat exchanger. As exhaust flows through the heat exchanger without any hindrance, the exhaust pressure may be lower than the threshold pressure. As heat from the exhaust is transferred to the coolant at the heat exchanger, the coolant temperature remains above the threshold coolant temperature. As the commanded position of the diverter valve matches the actual first position of the diverter valve, it may be inferred that the diverter valve is not degraded. During this time, the heat exchanger and the diverter valve may not be degraded and respective degradation flags may not be set.

At time t1, responsive to an increase in engine load (such as during a tip-in), the diverter valve may be actuated to the second position while maintaining the EGR valve closed to flow exhaust via the main exhaust passage directly to the tailpipe bypassing the heat exchanger. Also, at this time, exhaust heat recovery may no longer be requested. Between time t1 and t2, exhaust may not enter the bypass passage, and exhaust temperature upstream of the heat exchanger (Te) may be substantially equal to the exhaust temperature downstream of the heat exchanger. Based on the equilibrium between exhaust temperatures as measured by each of the first exhaust temperature sensor and the second exhaust temperature sensor, it may be indicated that both the first and the second temperature sensors are functioning and can continue to be used for exhaust heat exchange system diagnostics. As exhaust is not entering the bypass passage, it may be observed that the pressure upstream of the heat exchanger may be equal to the atmospheric pressure (BP). Also, based on the expected reading of the pressure sensor (showing current pressure as atmospheric pressure), it may be inferred that the pressure sensor is not degraded. During this time, as heat is not transferred to the coolant at the heat exchanger, coolant temperature may drop to below the threshold temperature.

At time t2, responsive to engine mid-load conditions, EGR demand may increase. In response to the demand for EGR, the EGR valve may be opened to admit a desired amount of exhaust to the engine intake via EGR delivery passage. The diverter valve may be maintained in the second position to flow the desired amount of exhaust from the exhaust manifold to the intake manifold via the heat exchanger. At this time, based on engine operating conditions (such as during mid-engine load conditions), exhaust heat recovery may not be desired while EGR may be desired. Between t2 and t3, since exhaust flows through the bypass passage and the heat exchanger, the first and the second exhaust temperatures may continue to be above their respective threshold temperatures. The exhaust pressure may be higher than the atmospheric pressure but may be lower than the threshold pressure.

At time t3, during operation in the EGR delivery mode, a decrease in the second exhaust temperature to below the threshold temperature (line 709) may be observed while the first exhaust temperature continues to be above the threshold (line 707). Also there may be an increase in the exhaust pressure to above the threshold pressure (line 713). Based on the undesired decrease in exhaust temperature downstream of the heat exchanger (without a decrease in pressure upstream of the heat exchanger) and the increase in pressure upstream of the heat exchanger, it may be inferred that there is degradation of the heat exchanger. In this example, it may be indicated that the heat exchanger is clogged and exhaust flow through it has been significantly reduced. Based on the detection of the heat exchanger degradation, a flag (a diagnostic code) indicating the degradation may be set. Between time t3 and t4, since exhaust may not effectively flow through the heat exchanger, the coolant temperature may decrease to below the threshold temperature (line 711). During this time, the commanded position of the diverter valve matches the actual second position of the diverter valve and it may be indicated that the diverter valve is not degraded.

Since the heat exchanger may no longer be optimally used for exhaust heat recovery or EGR cooling, exhaust may no longer be routed through the heat exchanger in the bypass passage. At time t4, the EGR valve may be closed while maintaining the diverter valve in the second position to flow exhaust directly to the tailpipe via the main exhaust passage.

FIG. 8 shows an example operating sequence 800 illustrating a second diagnostic routine for components of the heat exchange system of FIGS. 1A-1C. The diagnostic routine may be periodically and/or opportunistically carried out to monitor the health of a coolant system coupled to the heat exchanger of the heat exchange system. The horizontal (x-axis) denotes time and the vertical markers t1-t3 identify significant times in the operation of the exhaust bypass assembly system.

The first plot, line 802, shows an actual position of a diverter valve coupled to a junction of the main exhaust passage and the bypass passage housing the heat exchanger, as estimated via a position sensor coupled to the diverter valve. The second plot, line 804, shows a position of an exhaust gas recirculation (EGR) valve coupled to an EGR delivery passage delivering exhaust from the exhaust passage to the intake manifold. The third plot, line 806, shows a first exhaust temperature upstream of the heat exchanger as estimated via a first temperature sensor coupled to the bypass passage. The fourth plot, line 808, shows a second exhaust temperature downstream of the heat exchanger as estimated via a second temperature sensor coupled to the bypass passage. The fifth plot, line 810, shows coolant temperature in the outgoing coolant line coupled to the heat exchanger as estimated via a third temperature sensor coupled to the coolant line. Dotted line 811 shows a coolant temperature which may denote an expected coolant temperature after absorbing an expected amount of heat from the exhaust at the heat exchanger. The sixth plot, line 812, shows position of a coolant system degradation indicator flag.

Prior to time t1, responsive to engine cold-start conditions, the diverter valve may be actuated to a first position and the EGR valve may be in a closed position to flow the entire volume of exhaust from the main exhaust passage to the tailpipe via the heat exchanger without entering the EGR delivery passage. At t1, exhaust heat recovery may be requested for engine heating and/or passenger cabin heating. During this time, the second exhaust temperature may be lower than the first exhaust temperature as the exhaust gets cooled while flowing through the heat exchanger. As heat from the exhaust is transferred to the coolant at the heat exchanger, the coolant temperature may be above the threshold coolant temperature. During this time, the coolant system may be optimally functioning and degradation flags may be maintained in the off positions.

At time t1, responsive to engine mid-load conditions, EGR demand may increase, consequently the EGR valve may be opened and the diverter valve may be actuated to a second position to enable a desired amount of exhaust to flow to the engine intake via the EGR delivery passage. Between time t1 and t2, exhaust heat recovery may not be desired and EGR may be requested. During this time, as exhaust flows to the engine intake via the heat exchanger, heat is transferred to the coolant circulating through the heat exchanger and the coolant temperature may remain above the threshold temperature.

At time t2, during operation in the EGR delivery mode, the coolant temperature may decrease to below the threshold temperature indicating that heat transfer from the exhaust to the coolant may not be occurring. Also, since exhaust heat is not transferred to the coolant the heat exchanger, the temperature of the exhaust exiting the heat exchanger may also increase. Based on the lower than threshold coolant temperature and the increase in the second exhaust temperature, it may be inferred that the coolant system is degraded and may no longer be used for exhaust heat exchange or EGR cooling. Since the coolant system may no longer be optimally used for exhaust heat recovery or EGR cooling, exhaust may no longer be routed through the heat exchanger in the bypass passage. At time t3, in response to detection of coolant system degradation, the EGR valve may be closed while maintaining the diverter valve in the second position to flow exhaust directly to the tailpipe via the main exhaust passage.

An example method comprises: indicating degradation of a heat exchange system diverting exhaust, via a diverter valve, from downstream of an exhaust catalyst into a heat exchanger in an exhaust bypass, the indicating based on each of a first exhaust temperature and an exhaust pressure estimated upstream of the heat exchanger, a second exhaust temperature estimated downstream of the heat exchanger, and a temperature of coolant circulating through the heat exchanger. Any preceding example further comprises, additionally or optionally, responsive to the indication of degradation, disabling the diverting of exhaust through the heat exchanger in the exhaust bypass; and enabling direct flow of exhaust to a tailpipe via a main exhaust passage, bypassing the heat exchanger. In any or all of the preceding examples, additionally or optionally, the indicating is further based on an actual position of the diverter valve relative to a commanded position, the actual position estimated via a position sensor coupled to the diverter valve, the commanded position based on engine heating demand, the diverter valve coupled to a junction of an outlet of the exhaust bypass and a main exhaust passage. In any or all of the preceding examples, additionally or optionally, the heat exchange system further includes an exhaust gas recirculation (EGR) passage for recirculating exhaust from the exhaust bypass, downstream of the heat exchanger, to an engine intake manifold via an EGR valve, and wherein the indicating is further based on an actual position of the EGR valve. Any or all of the preceding examples further comprises, additionally or optionally, operating the heat exchange system in a first, heat recovery mode by actuating the EGR valve to a closed position and actuating the diverter valve to a first position to enable exhaust flow to the tailpipe via the heat exchanger; operating the heat exchange system in a second, EGR mode by actuating the EGR valve to an open position and actuating the diverter valve to a second position to enable exhaust flow to the engine intake manifold via the heat exchanger; and operating the heat exchange system in a third, bypass mode by actuating the EGR valve to the closed position and actuating the diverter valve to the second position to enable direct exhaust flow to the tailpipe, bypassing the heat exchanger, wherein the indicating is performed during each of the first, second, and third modes. In any or all of the preceding examples, additionally or optionally, the indicating includes: when operating the heat exchange system in one of the first mode and the second mode, indicating degradation of the heat exchanger responsive to each of the second exhaust temperature being lower than an expected second exhaust temperature and the estimated exhaust pressure being higher than an expected exhaust pressure; when operating the heat exchange system in one of the first mode and the second mode, indicating degradation of a coolant system circulating coolant through the heat exchanger responsive to the estimated coolant temperature being lower than an expected coolant temperature; and when operating the heat exchange system in one of the first, second, and third mode, indicating degradation of the diverter valve responsive to an actual position of the diverter valve differing from an expected position of the diverter valve. In any or all of the preceding examples, additionally or optionally, the expected second exhaust temperature is modeled based on one or more of engine load, engine temperature, engine speed, exhaust flow-rate, and coolant flow-rate through the heat exchanger, wherein the expected exhaust pressure is modeled based on one or more of engine load, engine temperature, engine speed, and exhaust flow-rate, and wherein the expected coolant temperature is modeled based on one or more of exhaust temperature, exhaust flow-rate, and coolant flow-rate. In any or all of the preceding examples, additionally or optionally, the expected position of the diverter valve includes the first position during the first mode, and the second position during each of the second and third mode, the first position enabling exhaust flow from downstream of the catalyst to the tailpipe via the exhaust bypass, and the second position disabling exhaust flow from downstream of the catalyst to the tailpipe via the exhaust bypass. In any or all of the preceding examples, additionally or optionally, the first exhaust temperature is estimated via a first temperature sensor coupled to the exhaust bypass, upstream of the heat exchanger, wherein the second exhaust temperature is estimated via a second temperature sensor coupled to the exhaust bypass, downstream of the heat exchanger, wherein the exhaust pressure is estimated via a pressure sensor coupled to the exhaust bypass, upstream of the heat exchanger, wherein the coolant temperature is estimated via a third temperature sensor coupled to a coolant line of the coolant system. In any or all of the preceding examples, additionally or optionally, the indicating further includes: while operating in the third mode, indicating degradation of the pressure sensor responsive to a higher than threshold pressure difference between the estimated exhaust pressure and atmospheric pressure; indicating degradation of at least one of the first temperature sensor and the second temperature sensor responsive to a higher than threshold difference between the first exhaust temperature and the second exhaust temperature; and indicating degradation of the third temperature sensor responsive to the estimated coolant temperature being higher than the expected coolant temperature. In any or all of the preceding examples, additionally or optionally, indicating degradation of the heat exchanger includes indicating the heat exchanger is clogged, wherein indicating degradation of the coolant system includes indicating one or more coolant lines are clogged, wherein indicating degradation of the diverter valve includes indicating the diverter valve is stuck in one of the open position, the closed position, and a partially open position.

Another example method comprises: while operating a heat exchange system to flow an entire volume of exhaust from downstream of an exhaust catalyst to a tailpipe via an exhaust bypass housing a heat exchanger, indicating degradation of the heat exchanger responsive to each of an exhaust pressure measured upstream of the heat exchanger being higher than a first threshold pressure, and a temperature difference between a first exhaust temperature measured upstream of the heat exchanger and a second exhaust temperature measured downstream of the heat exchanger being higher than a first threshold difference; indicating degradation of a coolant system circulating coolant through the heat exchanger responsive to coolant temperature measured at an outgoing line of the coolant system being lower than a first threshold coolant temperature; and indicating a diverter valve coupled at a junction of the exhaust bypass and a main exhaust passage is stuck closed or partially open responsive to an actual position of the diverter valve differing from a fully open position. Any preceding example further comprises, additionally or optionally, based on EGR demand, recirculating a portion of the exhaust from downstream of the heat exchanger to an engine intake manifold via an exhaust gas recirculation (EGR) valve; and during the recirculating, while the EGR valve is not degraded, indicating degradation of the heat exchanger responsive to each of the exhaust pressure measured upstream of the heat exchanger being higher than a second threshold pressure, and the temperature difference between the first exhaust temperature measured upstream of the heat exchanger and the second exhaust temperature measured downstream of the heat exchanger being higher than a second threshold difference; indicating degradation of the coolant system responsive to coolant temperature measured at the outgoing line of the coolant system being lower than a second threshold coolant temperature; and indicating the diverter valve is stuck open or partially open responsive to the actual position of the diverter valve differing from a fully closed position. Any or all of the preceding examples further comprises, additionally or optionally, while operating the heat exchange system to flow exhaust from downstream of the exhaust catalyst to the tailpipe via the main exhaust passage bypassing the heat exchanger, indicating degradation of one of a first temperature sensor coupled to the bypass passage upstream of the heat exchanger and a second temperature sensor coupled to the bypass passage downstream of the heat exchanger responsive to the temperature difference between the first exhaust temperature measured upstream of the heat exchanger and the second exhaust temperature measured downstream of the heat exchanger being higher than a third threshold difference; indicating degradation of a pressure sensor coupled to the bypass passage upstream of the heat exchanger responsive to a pressure difference between the exhaust pressure and atmospheric pressure being higher than a threshold pressure difference; indicating degradation of a third temperature sensor coupled to the coolant line responsive to the coolant temperature measured at the outgoing line of the coolant system being lower than a third threshold coolant temperature; and indicating the diverter valve is stuck open position or partially open responsive to the actual position of the diverter valve differing from the fully closed position. In any or all of the preceding examples, additionally or optionally, the first threshold exhaust pressure is higher than the second threshold exhaust pressure, the first threshold temperature difference is higher than the second threshold temperature difference, the second threshold temperature difference is higher than the third threshold temperature difference, the first threshold coolant temperature is substantially equal to each of the second threshold coolant temperature and the third threshold coolant temperature. In any or all of the preceding examples, additionally or optionally, the fully open position of the diverter valve enables exhaust flow from the exhaust bypass to the main exhaust passage and the fully closed position of the diverter valve disables exhaust flow from the exhaust bypass to the main exhaust passage. Any or all of the preceding examples further comprises, additionally or optionally, responsive to the indication of degradation of one or more of the heat exchanger and the coolant system, shifting the diverter valve to the fully closed position and closing the EGR valve to disable exhaust flow through the exhaust bypass.

In yet another example, an engine system comprises: an engine intake manifold; an engine exhaust system with an exhaust passage and a bypass passage, the exhaust passage including one or more exhaust catalysts and a muffler, the bypass passage coupled to the exhaust passage from downstream of the one or more exhaust catalysts to upstream of the muffler, the bypass passage including a heat exchanger; a first temperature sensor coupled to the bypass passage upstream of the heat exchanger for estimating a first exhaust temperature; a second temperature sensor coupled to the bypass passage downstream of the heat exchanger for estimating a second exhaust temperature; a pressure sensor coupled to the bypass passage upstream of the heat exchanger for estimating an exhaust pressure; a coolant system with an incoming coolant line and an outgoing coolant line for circulating coolant through the heat exchanger, the coolant system further coupled to each of an engine block and a heater core, the outgoing coolant line including a coolant temperature sensor for estimating a coolant temperature; a diverter valve coupling an outlet of the bypass passage to the exhaust passage; a position sensor coupled to the diverter valve for estimating a diverter valve position; an EGR passage with an EGR valve for recirculating exhaust gas from the bypass passage, downstream of the heat exchanger, to the intake manifold. The engine system further comprises a controller with computer readable instructions stored on non-transitory memory for: shifting the diverter valve to a first position and closing the EGR valve to operate the exhaust system in a first mode with exhaust flowing from downstream of the exhaust catalyst to upstream of the muffler via the bypass passage; shifting the diverter valve to a second position and opening the EGR valve to operate the exhaust system in a second mode with exhaust flowing from the bypass passage to the engine intake manifold via the EGR passage; shifting the diverter valve to a second position and closing the EGR valve to operate the exhaust system in a third mode with exhaust flowing directly from downstream of the exhaust catalyst to upstream of the muffler bypassing the heat exchanger; and while operating in one of the first mode and the second mode, indicating degradation of the heat exchanger responsive to each of a difference between the first temperature and the second temperature being higher than a threshold difference, and the second temperature being lower than a threshold temperature; and responsive to the indication of degradation, transitioning to the third mode. In any preceding example, additionally or optionally, the controller includes further instructions for: indicating degradation of the diverter valve in response to an estimated diverter valve position including the second position or a position in between the first position and the second position while operating in the first mode; and indicating degradation of the diverter valve in response to the estimated diverter valve position including the first position or a position in between the first position and the second position during one of the second mode and the third mode. In any or all of the preceding examples, additionally or optionally, the controller includes further instructions for: during operation in the third mode, indicating degradation of at least one of the first temperature sensor and the second temperature sensor based on an absolute temperature difference between the first temperature and the second temperature being higher than a threshold temperature difference; indicating degradation of the pressure sensor based on the absolute difference between the estimated exhaust pressure and the atmospheric pressure being higher than a threshold pressure difference; and indicating degradation of the coolant temperature sensor based on a higher than threshold coolant temperature.

In this way, by using a plurality of temperature and pressure sensors in the exhaust system, it may be possible to detect degradation of components of a combined heat exchange system including a heat exchanger, a coolant system fluidically coupled to the heat exchanger, and a diverter valve. By comparing exhaust temperature measured upstream and downstream of the heat exchanger during different modes of operation, it may be possible to detect clogging of the heat exchanger. By using a high resolution position sensor coupled to the diverter valve, it may be possible to detect if the position of the diverter valve is different from an expected position as commanded based on a current operational mode of the heat exchange system. By adjusting the temperature and pressure thresholds applied during the diagnostics based on the mode of operation of the heat exchange system, the distinct components of the heat exchange system may be independently diagnosed in each of the modes using the same set of sensors. The technical effect of validating the functionality of the sensors used for detecting degradation of the heat exchanger and the coolant system is that the reliability of the on-board diagnostics of the heat exchange system may be improved. Overall, by using a plurality of temperature, pressure, and diverter valve position sensors, diagnostics of the exhaust heat exchange system may be effectively carried out and degradation of each component of the system may be individually monitored and addressed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
diverting engine exhaust for a turbo-charged direct injection engine, via a diverter valve of a heat exchange system, from downstream of an exhaust catalyst and downstream of a turbocharger turbine into a heat exchanger in an exhaust bypass; and
indicating degradation of the heat exchange system based a first exhaust temperature and an exhaust pressure estimated upstream of the heat exchanger, a second exhaust temperature estimated downstream of the heat exchanger, and a temperature of coolant circulating through the heat exchanger sensed by a temperature sensor, the coolant returned to the engine or a heater core from the heat exchanger.

2. The method of claim 1, wherein the indicating is further based on a position of the diverter valve relative to a commanded position.

3. The method of claim 2 wherein, the commanded position is based on engine heating demand.

4. The method of claim 3 wherein, the diverter valve is coupled to a junction of an outlet of the exhaust bypass and a main exhaust passage.

5. The method of claim 1, wherein the heat exchange system further includes an exhaust gas recirculation (EGR) passage for recirculating exhaust from the exhaust bypass, downstream of the heat exchanger, to an engine intake manifold via an EGR valve.

6. The method of claim 5, and wherein the indicating is further based on an actual position of the EGR valve.

7. The method of claim 6, further comprising:
operating the heat exchange system in a first, heat recovery mode by actuating the EGR valve to a closed position and actuating the diverter valve to a first position to enable exhaust flow to the tailpipe via the heat exchanger.

8. The method of claim 6, further comprising:
operating the heat exchange system in a second, EGR mode by actuating the EGR valve to an open position and actuating the diverter valve to a second position to enable exhaust flow to the engine intake manifold via the heat exchanger.

9. The method of claim 6, further comprising:
operating the heat exchange system in a third, bypass mode by actuating the EGR valve to the closed position and actuating the diverter valve to the second position to enable direct exhaust flow to the tailpipe, bypassing the heat exchanger, wherein the indicating is performed during each of the first, second, and third modes.

10. The method of claim 7, wherein the indicating includes:
when operating the heat exchange system in the first mode, indicating degradation of the heat exchanger responsive to the second exhaust temperature being lower than an expected second exhaust temperature and the estimated exhaust pressure being higher than an expected exhaust pressure.

11. The method of claim 8, wherein the indicating includes:
when operating the heat exchange system in the second mode, indicating degradation of the heat exchanger responsive to each of the second exhaust temperature being lower than an expected second exhaust temperature and the estimated exhaust pressure being higher than an expected exhaust pressure.

12. The method of claim 7, wherein the indicating includes:
when operating the heat exchange system in the first mode, indicating degradation of a coolant system circulating coolant through the heat exchanger responsive to the estimated coolant temperature being lower than an expected coolant temperature.

13. The method of claim 9, wherein the indicating includes:
when operating the heat exchange system in the third mode, indicating degradation of the diverter valve responsive to an actual position of the diverter valve differing from an expected position of the diverter valve.

14. The method of claim 1, wherein the first exhaust temperature is estimated via a first temperature sensor coupled to the exhaust bypass, upstream of the heat exchanger.

15. The method of claim 1, wherein the second exhaust temperature is estimated via a second temperature sensor coupled to the exhaust bypass, downstream of the heat exchanger.

16. The method of claim 1, wherein the exhaust pressure is estimated via a pressure sensor coupled to the exhaust bypass, upstream of the heat exchanger.

17. The method of claim 1, further comprising, responsive to the indication of degradation, disabling the diverting of exhaust through the heat exchanger in the exhaust bypass; and enabling direct flow of exhaust to a tailpipe via a main exhaust passage, bypassing the heat exchanger.

18. A method, comprising:
generating exhaust gas form a direct injection turbocharged engine;
while operating a heat exchange system to flow an entire volume of the exhaust from downstream of an exhaust catalyst to atmosphere via an exhaust bypass housing a heat exchanger,
indicating degradation of the heat exchanger responsive to each of an exhaust pressure measured upstream of the heat exchanger being higher than a first threshold pressure, and a temperature difference between a first exhaust temperature measured upstream of the heat exchanger and a second exhaust temperature measured downstream of the heat exchanger being higher than a first threshold difference;
indicating degradation of a coolant system circulating coolant through the heat exchanger responsive to coolant temperature measured at an outgoing line of the coolant system being lower than a first threshold coolant temperature; and indicating a diverter valve coupled at a junction of the exhaust bypass and a main exhaust passage is stuck closed or partially open responsive to an actual position of the diverter valve differing from a fully open position.

19. The method of claim 18 further comprising:

based on EGR demand, recirculating a portion of the exhaust from downstream of the heat exchanger to an engine intake manifold via an exhaust gas recirculation (EGR) valve; and during the recirculating, while the EGR valve is not degraded, indicating degradation of the heat exchanger responsive to each of the exhaust pressure measured upstream of the heat exchanger being higher than a second threshold pressure, and the temperature difference between the first exhaust temperature measured upstream of the heat exchanger and the second exhaust temperature measured downstream of the heat exchanger being higher than a second threshold difference;

indicating degradation of the coolant system responsive to coolant temperature measured at the outgoing line of the coolant system being lower than a second threshold coolant temperature; and indicating the diverter valve is stuck open or partially open responsive to the actual position of the diverter valve differing from a fully closed position.

20. The method of claim 18, further comprising:

while operating the heat exchange system to flow exhaust from downstream of the exhaust catalyst to the tailpipe via the main exhaust passage bypassing the heat exchanger, indicating degradation of one of a first temperature sensor coupled to the bypass passage upstream of the heat exchanger and a second temperature sensor coupled to the bypass passage downstream of the heat exchanger responsive to the temperature difference between the first exhaust temperature measured upstream of the heat exchanger and the second exhaust temperature measured downstream of the heat exchanger being higher than a third threshold difference;

indicating degradation of a pressure sensor coupled to the bypass passage upstream of the heat exchanger responsive to a pressure difference between the exhaust pressure and atmospheric pressure being higher than a threshold pressure difference;

indicating degradation of a third temperature sensor coupled to the coolant line responsive to the coolant temperature measured at the outgoing line of the coolant system being lower than a third threshold coolant temperature; and indicating the diverter valve is stuck open position or partially open responsive to the actual position of the diverter valve differing from the fully closed position.

* * * * *